United States Patent
Seo et al.

(10) Patent No.: US 6,295,255 B1
(45) Date of Patent: Sep. 25, 2001

(54) OPTICAL PICKUP HAVING A TILT MECHANISM TO ADJUST AN OPTICAL AXIS OF AN INCIDENT LIGHT BEAM

(75) Inventors: Young-sun Seo, Sungnam; Han-kook Choi, Suwon; Pyong-yong Seong, Seoul; In-sik Park, Suwon; Hee-deuk Park, Sungnam; Young-min Cheong; Dong-ho Shin, both of Seoul, all of (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/315,989

(22) Filed: May 21, 1999

(30) Foreign Application Priority Data

May 21, 1998 (KR) .................................................. 98-18384
Jun. 9, 1998 (KR) .................................................. 98-21325
Dec. 2, 1998 (KR) .................................................. 98-52512

(51) Int. Cl.[7] ....................................................... G11B 7/00
(52) U.S. Cl. .................................... 369/44.32; 369/44.15; 369/44.22; 369/112.29
(58) Field of Search ............................. 369/44.32, 53.19, 369/53.12, 44.15, 44.16, 44.17, 44.14, 112.01, 119, 112.29

(56) References Cited

U.S. PATENT DOCUMENTS 5,430,699  7/1995  Matsubara et al. ............... 369/44.32

FOREIGN PATENT DOCUMENTS 0 189 932     8/1986  (EP) .
0 472 084 A2  2/1992  (EP) .
60-127629     8/1985  (JP) .
4-103036      4/1992  (JP) .

Primary Examiner—Paul W. Huber
(74) Attorney, Agent, or Firm—Staas & Halsey LLP

(57) ABSTRACT

An optical pickup includes a rotary block rotatably installed on a fixed base; a holder integrally coupled to the rotary block; a bobbin supported by a wires of the holder to be movable; a base plate fixed to the fixed base and placed between the rotary block and the bobbin; an objective lens mounted in the bobbin, for focusing an incident light to form a spot of light on a recording medium; a focusing coil and tracking coils installed in the bobbin, serving as a current flow path for focusing and tracking operations; first magnets and first inner and outer yokes installed in the base plate, facing the focusing coil and the tracking coils, for producing magnetic fields perpendicular to the current flowing through the focusing coil and the tracking coils to produce an electromagnetic force for driving the bobbin; a fixed optical system for irradiating light toward the recording medium and receiving the light reflected by the recording medium and then passed through the objective lens; a reflecting mirror for changing the traveling path of the incident light, the reflecting mirror installed in the rotary block to be arranged between the objective lens and the fixed optical system; tilt coils serving as a current flow path, the tilt coils installed at both sides of the rotary block; and second magnets and second inner and outer yokes installed facing the tilt coils, for producing magnetic fields perpendicular to the current flowing through the tilt coils to produce an electromagnetic force for rotating the rotary block. Therefore, the tilt of the optical axis of the light incident onto and reflected by an optical disk through the reflecting mirror and the objective lens can be adjusted according to the tilt of the recording medium, such that the light is perpendicularly incident onto and reflected by the recording medium all the time.

27 Claims, 24 Drawing Sheets

OPTICAL PICKUP HAVING A TILT MECHANISM TO ADJUST AN OPTICAL AXIS OF AN INCIDENT LIGHT BEAM

CROSS-REFERENCE TO RELATED APPLICATIONS

This application claims the benefit of Korean Application Nos. 98-18384, filed May 21, 1998, 98-21325, filed Jun. 9, 1998 and 98-52512, filed Dec. 2, 1998, in the Korean Patent Office, the disclosures of which are incorporated herein by reference.

BACKGROUND OF THE INVENTION

1. Field of the Invention

The present invention relates to an optical pickup for irradiating light onto a recording medium to record information in the recording medium and to read information therefrom, and more particularly, an optical pickup having a tilt mechanism to adjust an optical axis of an incident light beam to compensate for tilting of a recording medium such as an optical disk.

2. Description of the Related Art

In general, an optical recording/reproducing apparatus such as a disk player, for recording information in a recording medium such as an optical disk and reproducing information therefrom, comprises an optical pickup for reading information from light that is irradiated onto the optical disk and then reflected therefrom. In a conventional optical pickup, as shown in FIGS. 1 and 2, a base plate 21 is installed on a fixed base 20, and a bobbin 23 in which an objective lens 19 is mounted is movably supported by wires 28 in a fixed block 22 situated on the base plate 21. Also, a focusing coil 26 for controlling the focus of a spot of light formed on an optical disk 30, and a tracking coil 27 for laterally moving the objective lens 19 such that the spot of light formed on the optical disk 30 accurately tracks the tracks (not shown) of the optical disk 30, are installed in the bobbin 23. The bobbin 23 moves by an electromagnetic force due to interaction between a current flowing through the focusing coil 26 and the tracking coil 27, and the magnetic field produced by a magnet 25 and a yoke 24 installed in the base plate 21. A reflecting mirror 18 for changing an optical path, and a fixed optical system 10 for irradiating light from the reflecting mirror 18 to the optical disk 30 and receiving the light reflected by the optical disk 30 are placed below the objective lens 19. As shown in FIG. 1, the fixed optical system 10 includes a light source 11, a beam splitter 13, a collimating lens 14, a detecting lens 15 and a photodetector 12. Also, each semispherical base of the fixed base 20 and the base plate 21 contact each other and are coupled by a plurality of adjusting screws 41, 42 and 43, such that the tilt of the base plate 21 with respect to the fixed base 20 can be adjusted by tightening the plurality of adjusting screws 41, 42 and 43. This structure is suitable for correcting an error through the controlling of the fightness of the adjusting screws 41, 42 and 43 during the assembly process in the case when an optical axis C of light incident through the objective lens 19 perpendicularly onto the optical disk 30 is tilted, that is, when the light is obliquely incident, not perpendicularly, onto the optical disk 30. Reference numeral 50 represents a controller for controlling the focusing and tracking operations, and reference S represents a compression spring.

However, the optical disk 30 may be tilted due to vibration during the recording/reproducing operation as well as during the assembly process, and the optical disk 30 may not be level due to minute deformations of the optical disk 30 itself. However, the conventional optical disk can not cope with such a problem. In other words, even when the tilt of the optical axis C during the assembly can be corrected, the tilting of the optical axis C during the recording/reproducing operation after the assembly process cannot be corrected. As a result, the intensity of light formed on the optical disk is not strong enough for the recording operation and a playback signal is deteriorated, so that it is difficult to accurately reproduce the information.

SUMMARY OF THE INVENTION

It is an object of the present invention to provide an optical pickup adopting an enhanced structure in which the tilt of an optical axis of a light being incident onto and reflected from an optical disk through a reflecting mirror and an objective lens is controlled such that the light is perpendicularly incident onto and reflected from the recording medium at all times.

Additional objects and advantages of the invention will be set forth in part in the description which follows and, in part, will be obvious from the description, or may be learned by practice of the invention.

To achieve the above and other objects of the present invention, according to an aspect of the object, there is provided an optical pickup comprising: a fixed base; a base plate rotatably installed with respect to the fixed base; a bobbin seated on the base plate, being movably supported by wires; an objective lens for focusing an incident light to form a spot of light on a recording medium, the objective lens mounted in the bobbin; a focusing coil serving as a current flow path for a focusing operation, the focusing coil installed on the bobbin; first magnets and first yokes for producing magnetic fields perpendicular to the current flowing through the focusing coil to produce an electromagnetic force for driving the bobbin, the first magnets and first yokes installed on the base plate; a fixed optical system for irradiating the incident light toward the recording medium and receiving the light reflected by the recording medium and then passed through the objective lens; a reflecting mirror for changing the traveling path of the incident light, the reflecting mirror arranged between the objective lens and the fixed optical system, and fixed to the base plate; a support arm having one end fixed to the fixed base and the other end rotatably supporting the reflecting mirror, serving as a rotary shaft of the base plate to which the reflecting mirror is fixed; and a tilt mechanism for rotating the base plate using the support arm as a rotary shaft, to adjust the tilt of an optical axis passing through the objective lens and the reflecting mirror.

To achieve the above and other objects of the present invention, according to another aspect of the object, there is provided an optical pickup comprising: a fixed base; a base plate installed rotatable with respect to the fixed base; a hollow boss formed to protrude on the base plate; a bobbin coupled to the boss to be movable in the vertical direction; an objective lens for focusing an incident light to form a spot of light on a recording medium, the objective lens mounted in the bobbin; focusing coils serving as a current flow path for a focusing operation, the focusing coils installed on the bobbin; first magnets and first yokes for producing magnetic fields perpendicular to the current flowing through the focusing coils to produce an electromagnetic force for driving the bobbin, the first magnets and first yokes installed on the base plate; a fixed optical system for irradiating the incident light toward the recording medium and receiving the light reflected by the recording medium and then passed through the objective lens; a reflecting mirror for changing the traveling path of the incident light, the reflecting mirror arranged between the objective lens and the fixed optical system, and fixed to the base plate; a support arm having one end fixed to the fixed base and the other end rotatably supporting the reflecting mirror, serving as a rotary shaft of the base plate to which the reflecting mirror is fixed; and a tilt mechanism for rotating the base plate using the support arm as a rotary shaft, to adjust the tilt of an optical axis passing through the objective lens and the reflecting mirror.

To achieve the above and other objects of the present invention, according to still another aspect of the object, there is provided an optical pickup comprising: a fixed base; a base plate positioned within the fixed base, and supported by springs to be rotatable relative to the fixed base; a bobbin seated on the base plate, being supported by wires to be movable; an objective lens for focusing an incident light to form a spot of light on a recording medium, the objective lens mounted in the bobbin; a focusing coil and tracking coils serving as a current flow path for focusing and tracking operations, the focusing coil and tracking coils installed on the bobbin; first magnets and first yokes for producing magnetic fields perpendicular to the current flowing through the focusing coil and the tracking coils to produce an electromagnetic force for driving the bobbin, the first magnets and first yokes installed on the base plate; a fixed optical system for irradiating the incident light toward the recording medium and receiving the light reflected by the recording medium and then passed through the objective lens; a reflecting mirror for changing the traveling path of the incident light, the reflecting mirror arranged between the objective lens and the fixed optical system, and fixed to the base plate; and a tilt mechanism for elastically rotating the base plate elastically supported by the springs, to adjust the tilt of an optical axis passing through the objective lens and the reflecting mirror.

To achieve the above and other objects of the present invention, according to yet still another aspect of the object, there is provided an optical pickup comprising: a fixed base; a rotary block installed on the fixed base to be rotatable; a holder integrally coupled to the rotary block; a bobbin supported by wires of the holder to be movable; a base plate fixed to the fixed base and placed between the rotary block and the bobbin; an objective lens for focusing an incident light to form a spot of light on a recording medium, the objective lens mounted in the bobbin; a focusing coil and tracking coils serving as a current flow path for focusing and tracking operations, the focusing coil and tracking coils installed on the bobbin; first magnets and first inner and outer yokes for producing magnetic fields perpendicular to the current flowing through the focusing coil and the tracking coils to produce an electromagnetic force for driving the bobbin, the first magnets and first inner and outer yokes installed on the base plate, facing the focusing coil and the tracking coils; a fixed optical system for irradiating the incident light toward the recording medium and receiving the light reflected by the recording medium and then passed through the objective lens; a reflecting mirror for changing the traveling path of the incident light, the reflecting mirror installed on the rotary block to be arranged between the objective lens and the fixed optical system; and a tilt mechanism for rotating the rotary block to adjust the tilt of an optical axis passing through the objective lens and the reflecting mirror.

BRIEF DESCRIPTION OF THE DRAWINGS

The above object and advantages of the present invention will become more apparent by describing in detail preferred embodiments thereof with reference to the attached drawings in which.

DESCRIPTION OF THE PREFERRED EMBODIMENTS

Figure 1:
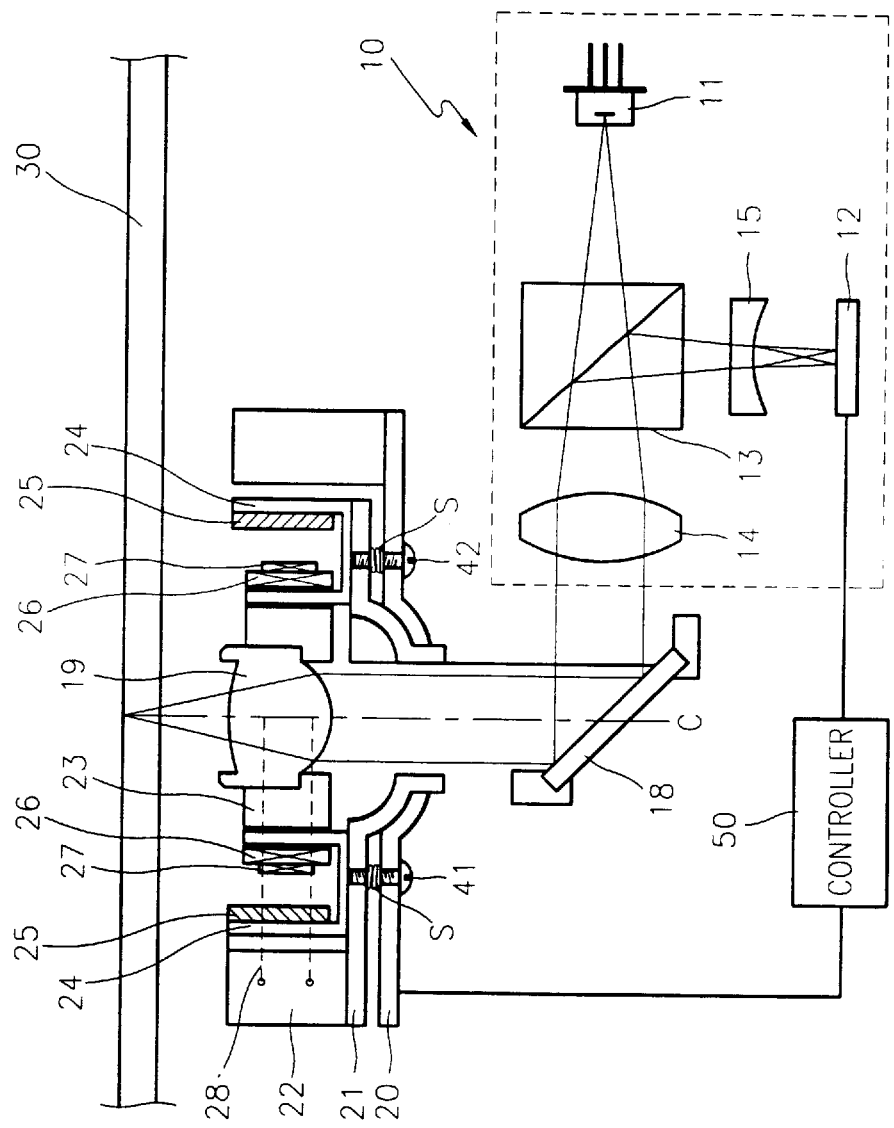
FIG. 1 is a sectional view showing the structure of a conventional optical pickup.
Figure 2:
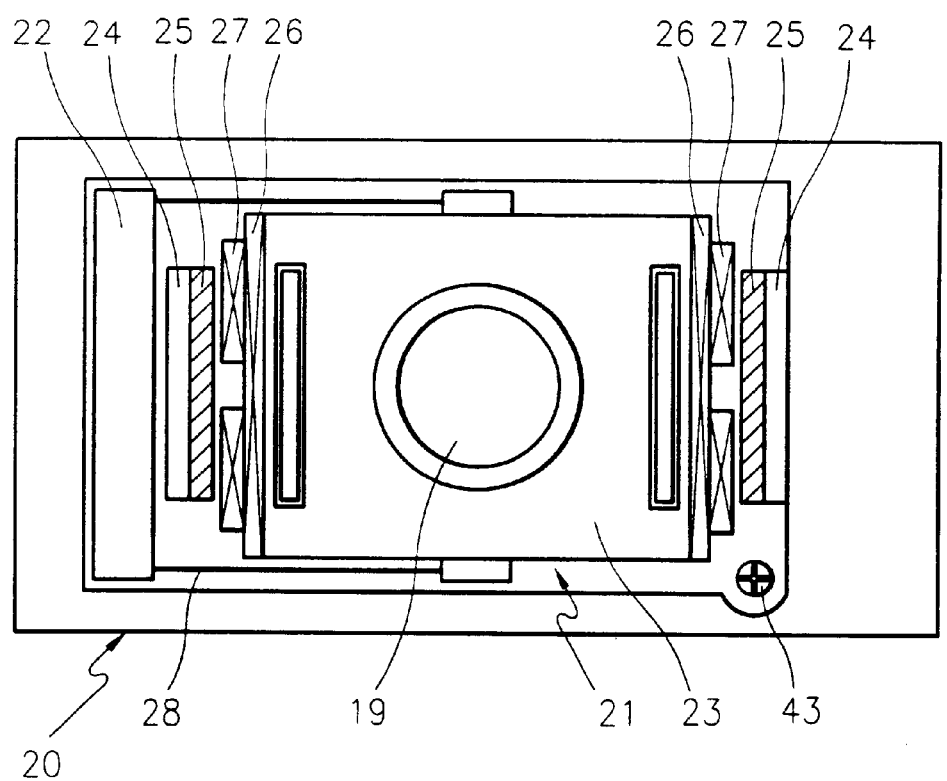
FIG. 2 is a plane view of the conventional optical pickup shown in FIG. 1.

Reference will now made in detail to the present preferred embodiments of the present invention, examples of which are illustrated in the accompanying drawings, wherein like reference numerals refer to the like elements throughout. The embodiments are described below in order to explain the present invention by referring to the figures.

An optical pickup according to a first embodiment of the present invention, in which a bobbin is supported by wires, will be described with reference to FIGS. 3 through 10.

Figure 3:
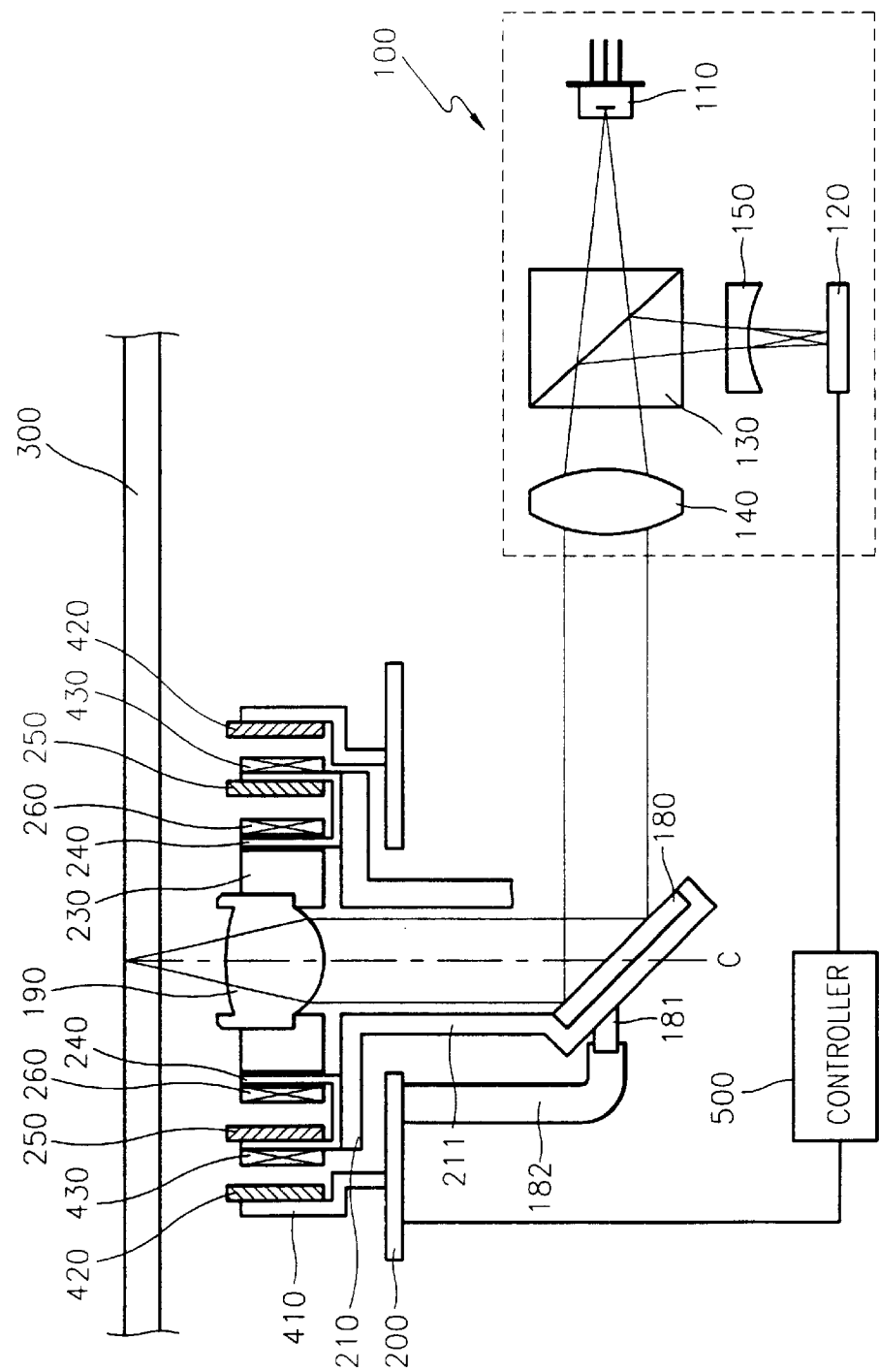
FIG. 3 is a sectional view showing the structure of an optical pickup according to a first embodiment of the present invention.
Figure 4:
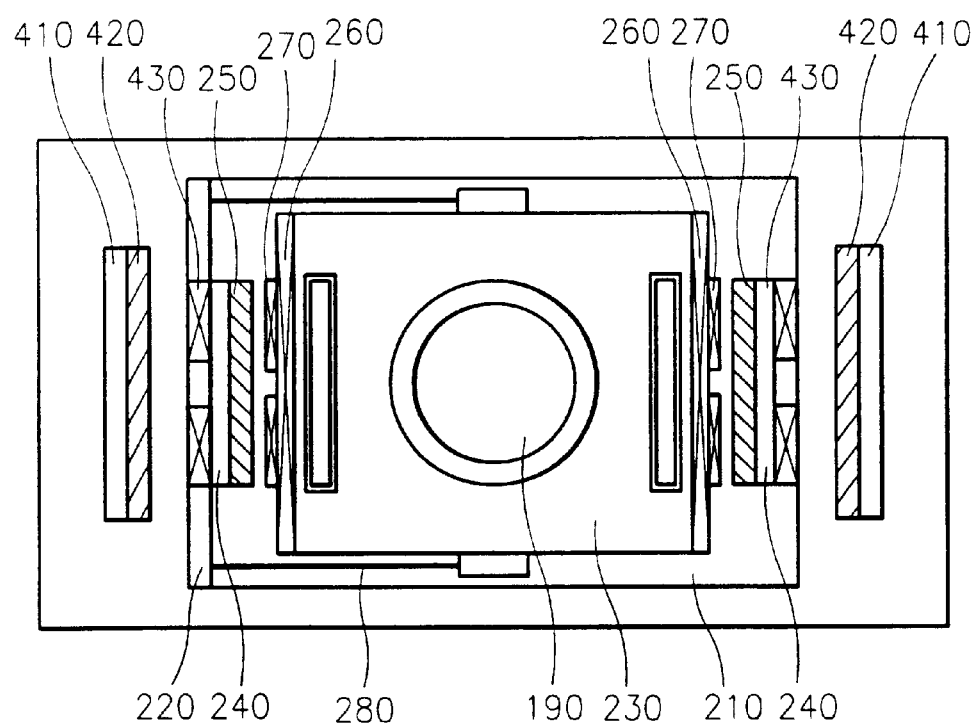
FIG. 4 is a plane view of the optical pickup shown in FIG. 3.
Figure 5:
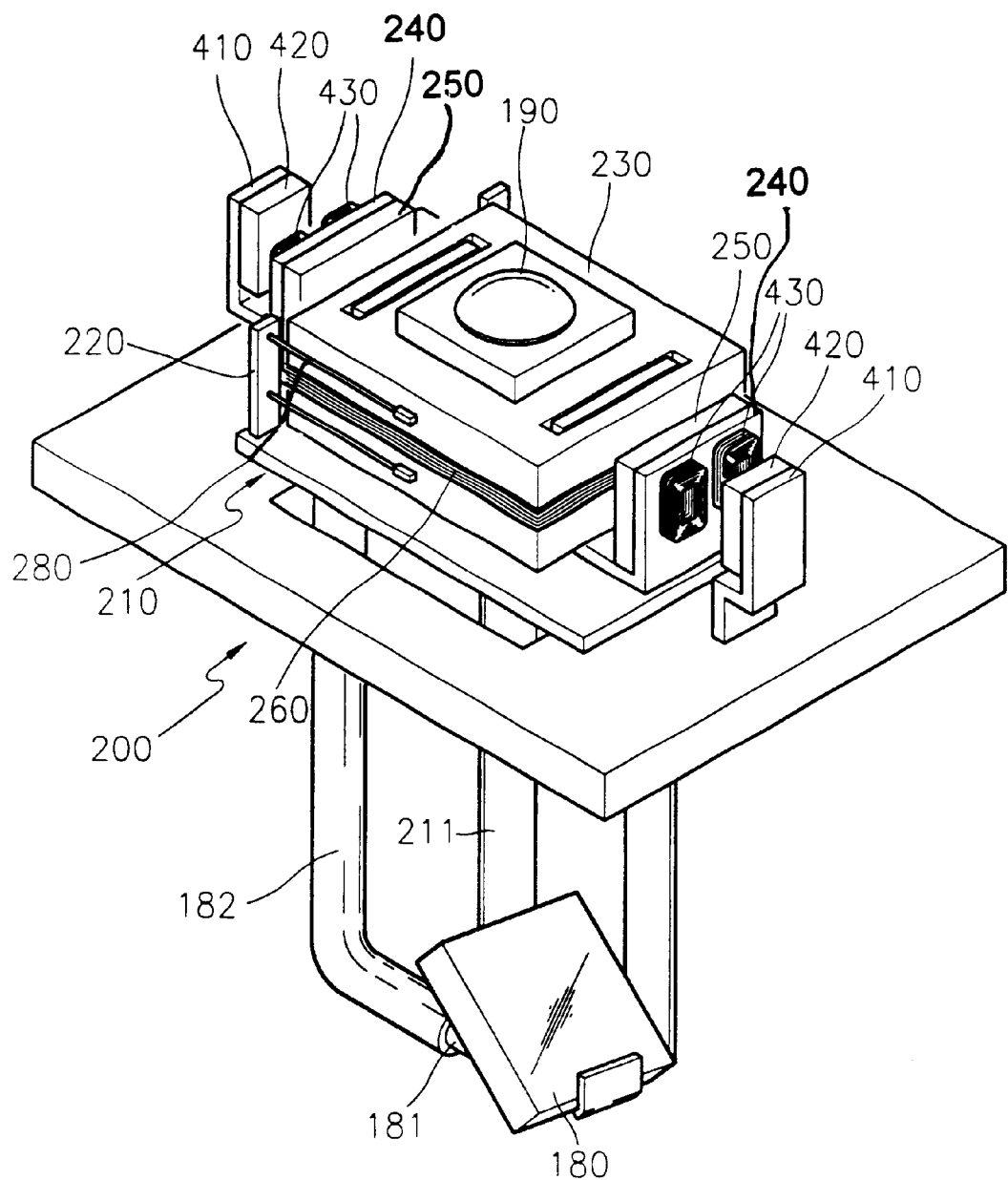
FIG. 5 is a perspective view showing the main elements of the optical pickup shown in FIG. 3.

Referring to FIGS. 3 through 5, a base plate 210 is arranged on a fixed base 200, and a bobbin 230 is movably supported by wires 280 connected to a fixed block 220 above the base plate 210. Also, an objective lens 190 for focusing an incident light to form a spot of light on a recording medium such as an optical disk 300 is mounted in the bobbin 230, and focusing coils 260 serving as a current flow path for a focusing operation are installed. Also, first magnets 250 and first yokes 240 for producing magnetic fields perpendicular to the current flowing through the focusing coils 260 to produce an electromagnetic force for driving the bobbin 230 are installed on the base plate 210. Also, the optical pickup according to the first embodiment of the present invention comprises a fixed optical system 100 for irradiating the incident light onto the optical disk 300 and receiving the light reflected by the optical disk 300. The fixed optical system 100 includes a light source 110, a beam splitter 130, a collimating lens 140, a detecting lens 150 and a photodetector 120. Also, a reflecting mirror 180 for changing the traveling path of an incident light is arranged between the objective lens 190 and the fixed optical system 100. The reflecting mirror 180 is fixed to a pair of arms 211 extended from the base plate 210 to be integrally movable with the base plate 210. Also, one of the arms 210, which shields the base of the reflecting mirror 180, has a predetermined coupling bar 181, and the coupling bar 181 is rotatably coupled to a support arm 182 fixed to the fixed base 200. Thus, the support arm 182 supports the entire base plate 210 including the reflecting mirror 180 against the fixed base 200, and simultaneously serves as a rotary shaft of the base plate 210 by rotatably supporting the reflecting mirror 181.

Figure 6:
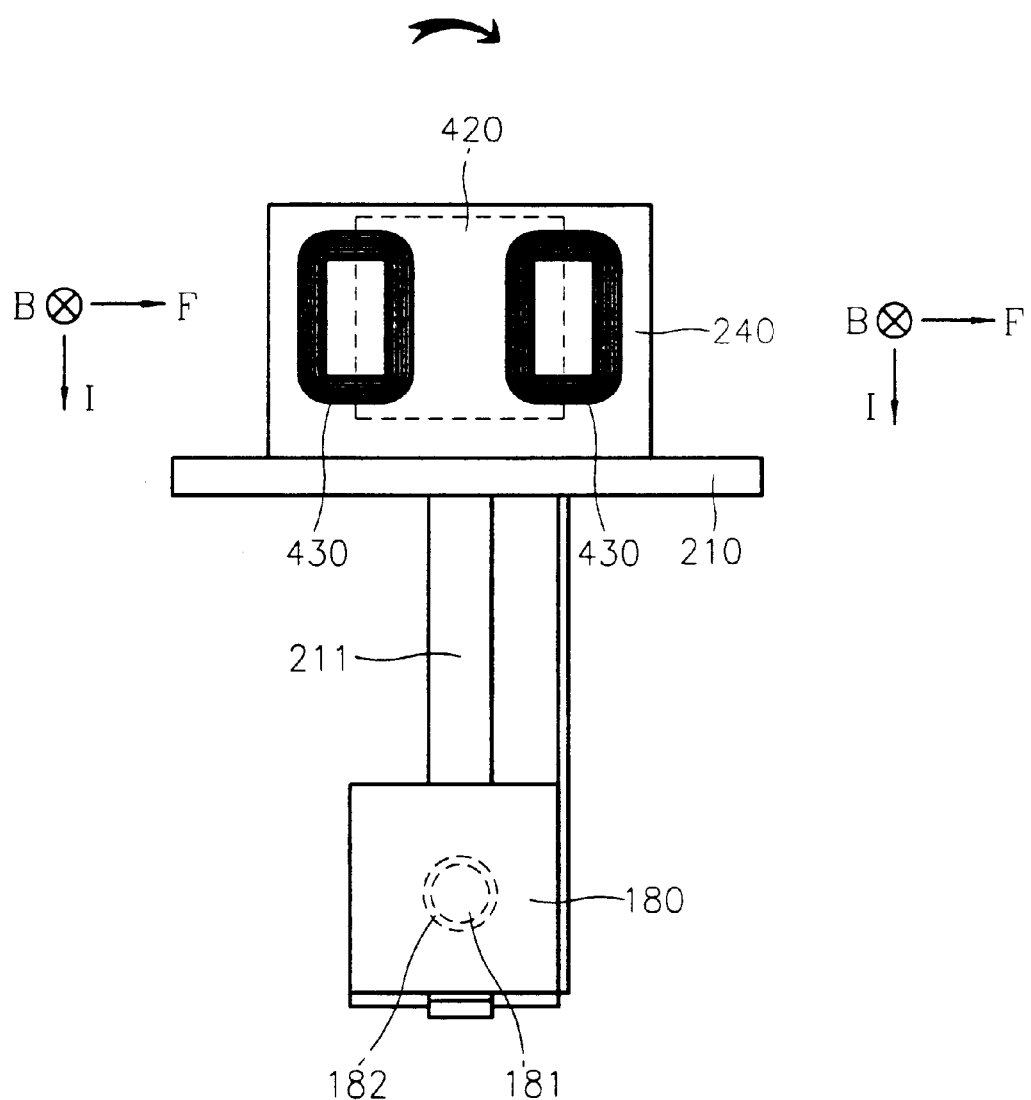
FIGS. 6 and 7 are diagrams illustrating the principle of a tilt operation of the optical pickup shown in FIG. 3.
Figure 7:
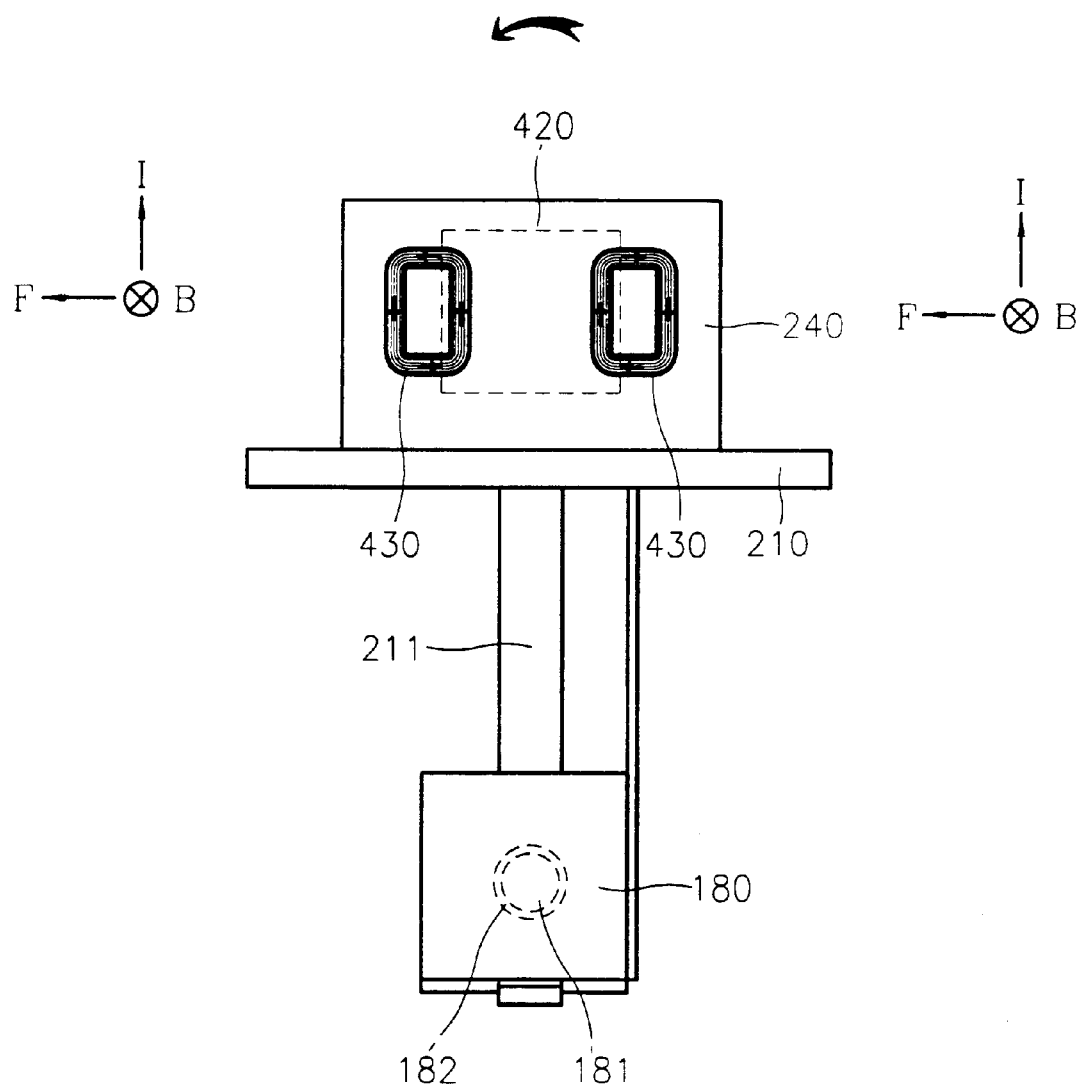

Also, there is tilt means for adjusting the tilt of an optical axis C passing through the objective lens 190 and the reflecting mirror 180 by rotating the base plate 210. The tilt means comprises tilt coils 430 attached to each outer wall of the first yokes 240 to provide a current flow path, and second magnets 420 and second yokes 410 installed on the fixed base 200 to produce magnetic fields perpendicular to the current flowing through the tilt coils 430, thereby producing an electromagnetic force capable of rotating the base plate 210. Here, the pairs of tilt coils 430 are symmetrically arranged centering around the bobbin 230, respectively facing each second magnet 420. Also, as shown in FIGS. 6 and 7, the tilt coils 430 are arranged such that only inner vertical parts thereof overlap the second magnet 420. In this overlapped state, current I flows through the pair of tilt coils 430 in the direction indicated by arrows as shown in FIG. 6, the effect of the current horizontally flowing through the tilt coils 430 is offset, and an electromagnetic force is produced in the direction F due to the interaction between the current I that flows vertically and the magnetic fields B produced by the second magnets 420, so that the base plate 210 rotates clockwise on the support arm 182 coupled to the coupling bar 181. On the contrary, when current I flows through the tilt coils 430 in the direction indicated by arrows as shown in FIG. 7, an electromagnetic force is produced in the direction F due to the interaction with the magnetic fields B by the second magnets 420, so that the base plate 210 rotates counterclockwise. Thus, the rotation direction of the base plate 210 can be controlled by controlling the direction of current flowing through the tilt coils 430. Reference numeral 500 (shown in FIG. 3) represents a controller for controlling the current flowing through the tilt coils 430 and through the focusing coils 260.

Figure 8:
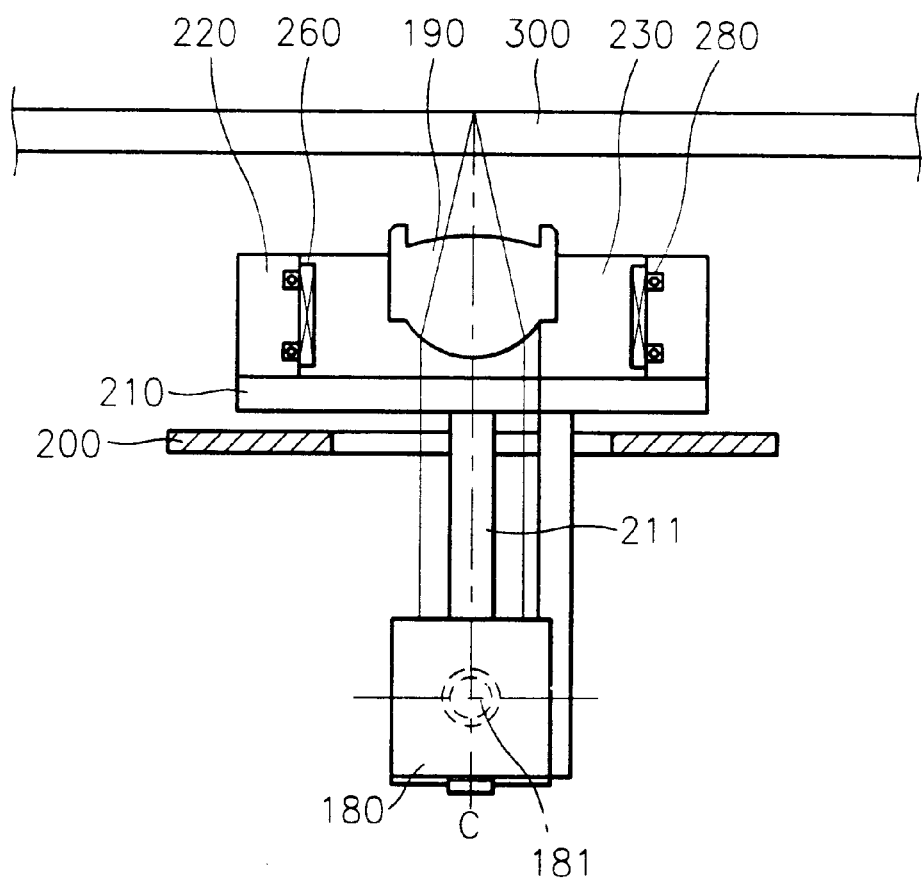
FIGS. 8 through 10 are diagrams illustrating an adjustment operation of the optical pickup shown in FIG. 3 to compensate for the tilt of an optical disk.

In the optical pickup constructed as above, when the optical disk 300 for a data recording/reproduction is level as shown in FIG. 8, current does not flow through the tilt coils 430 and accordingly the base plate 210 maintains the level state without rotation. In this state, the focusing operation by the focusing coils 260, the first magnets 250 and the first yokes 240 is also performed.

Figure 9:
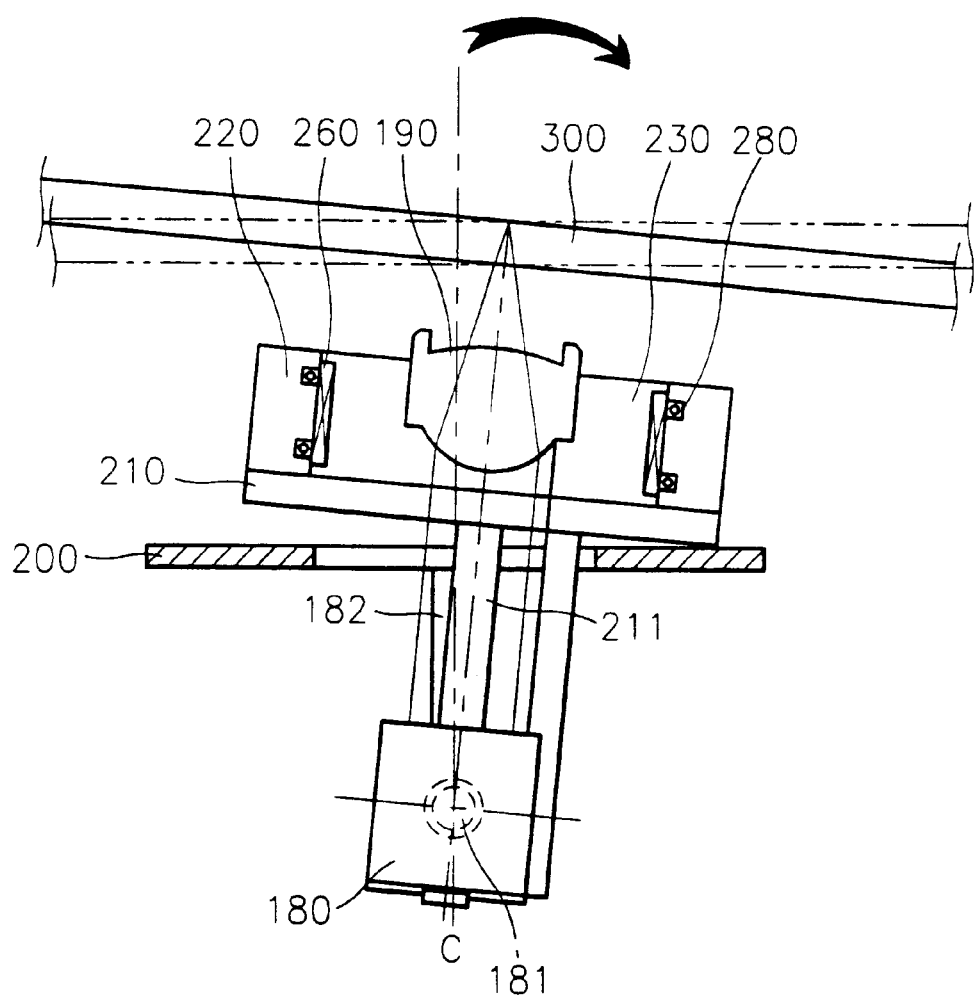

Also, when the optical disk 300 tilts to the right (clockwise) as shown in FIG. 9, the controller 500 allows current to flow through the tilt coils 430 in the direction indicated in FIG. 6 to rotate the base plate 210 clockwise such that the optical axis C passing through the objective lens 190 and the reflecting mirror 180 is incident perpendicular to the optical disk 300. That is, the base plate 210 is rotated to be tilted as much as the optical disk 300 such that the optical axis C is perpendicular to the optical disk 300.

Figure 10:
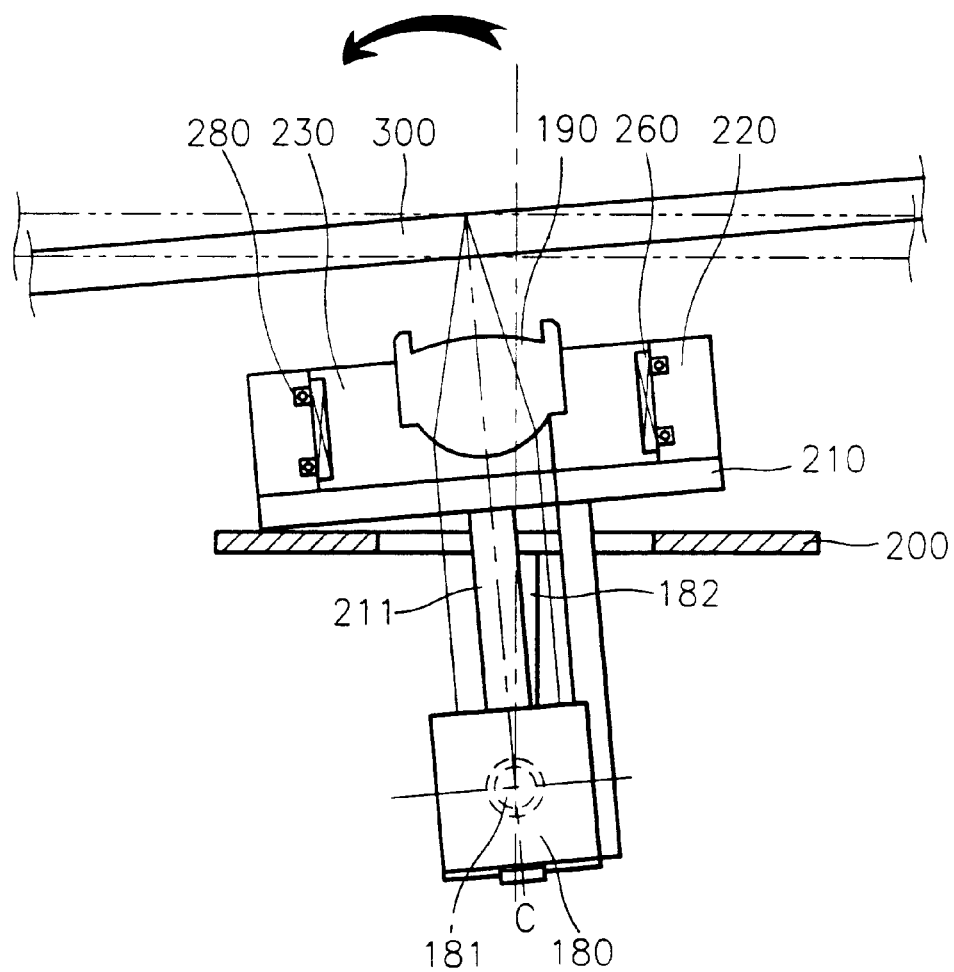

Meanwhile, when the optical disk 300 tilts to the left (counterclockwise) as shown in FIG. 10, the controller 500 allows current to flow through the tilt coils 430 in the direction indicated in FIG. 7, to rotate the base plate 210 counterclockwise.

The tilting of the optical axis C passing through the objective lens 190 and the reflecting mirror 180 can be dynamically offset by rotating the base plate 210 according to the tilt of the optical disk 300.

Also, the optical pickup according to the first embodiment of the present invention can perform the tracking operation by using the above-described tilt means. That is, while rotating the base plate 210 using the electromagnetic force produced by the tilt coils 430 and the second magnets 420, the optical axis C is microscopically moved for tracking. Thus, the optical axis C is microscopically adjusted in accordance to the tilt of the optical disk 300 through the tilt operation, and then the base plate 210 is microscopically rotated in a state such that the tracking is performed along the tracks of the optical disk 300. In general, the optical axis rotates in the range of about ±1° during the tilt operation, and rotates in a microscopic range of about ±0.25° during tracking. Thus, the tracking operation can be performed without extra coils and magnets for the tracking.

An optical pickup according to a second embodiment of the present invention will be described with reference to FIGS. 11 through 17, in which a bobbin is not supported by wires, in contrast to the optical pickup according to the first embodiment, and the bobbin is inserted into a predetermined boss to be slidably movable in the direction of the optical axis.

Figure 11:
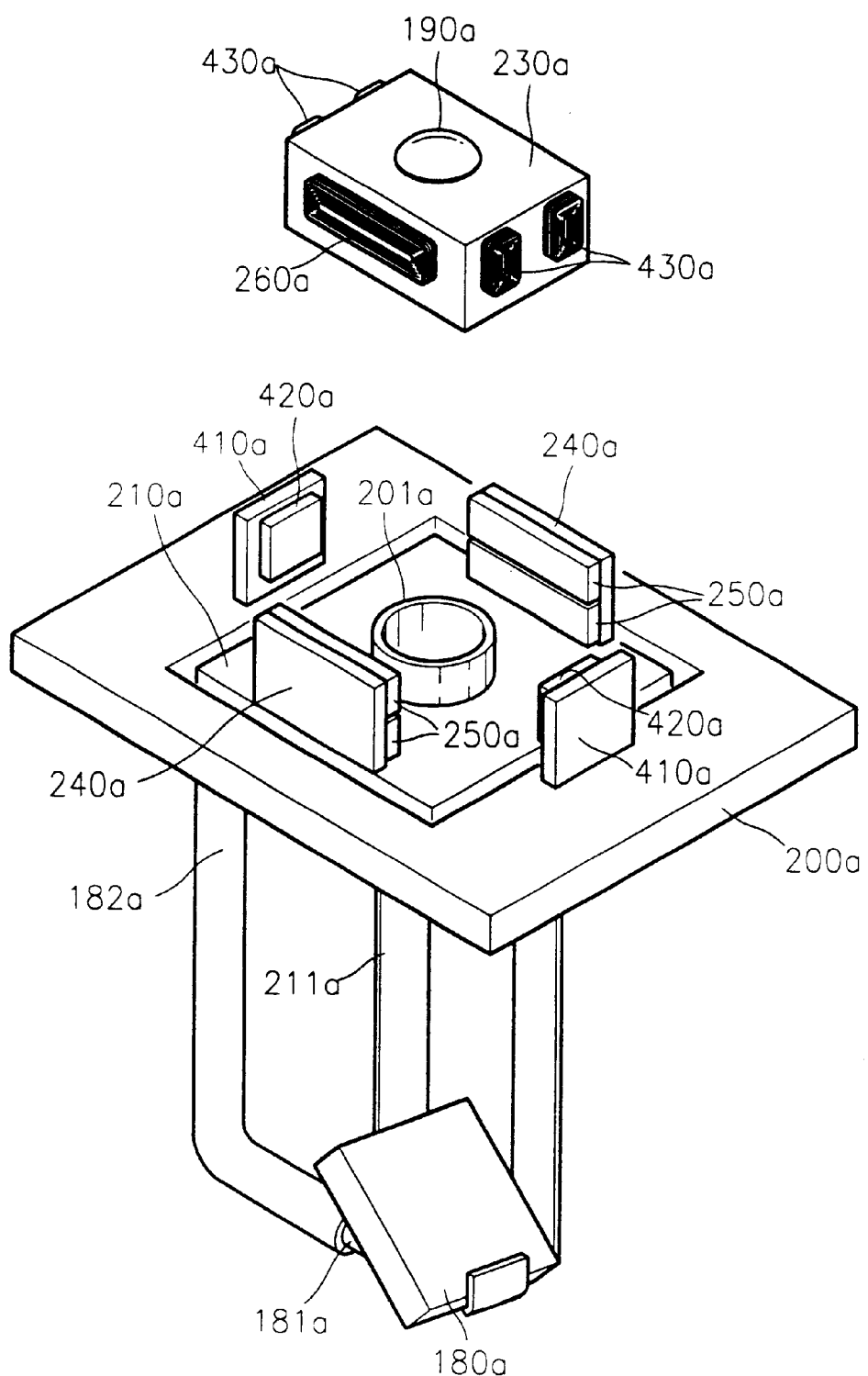
FIG. 11 is a perspective view showing the structure of an optical pickup according to a second embodiment of the present invention.
Figure 12:
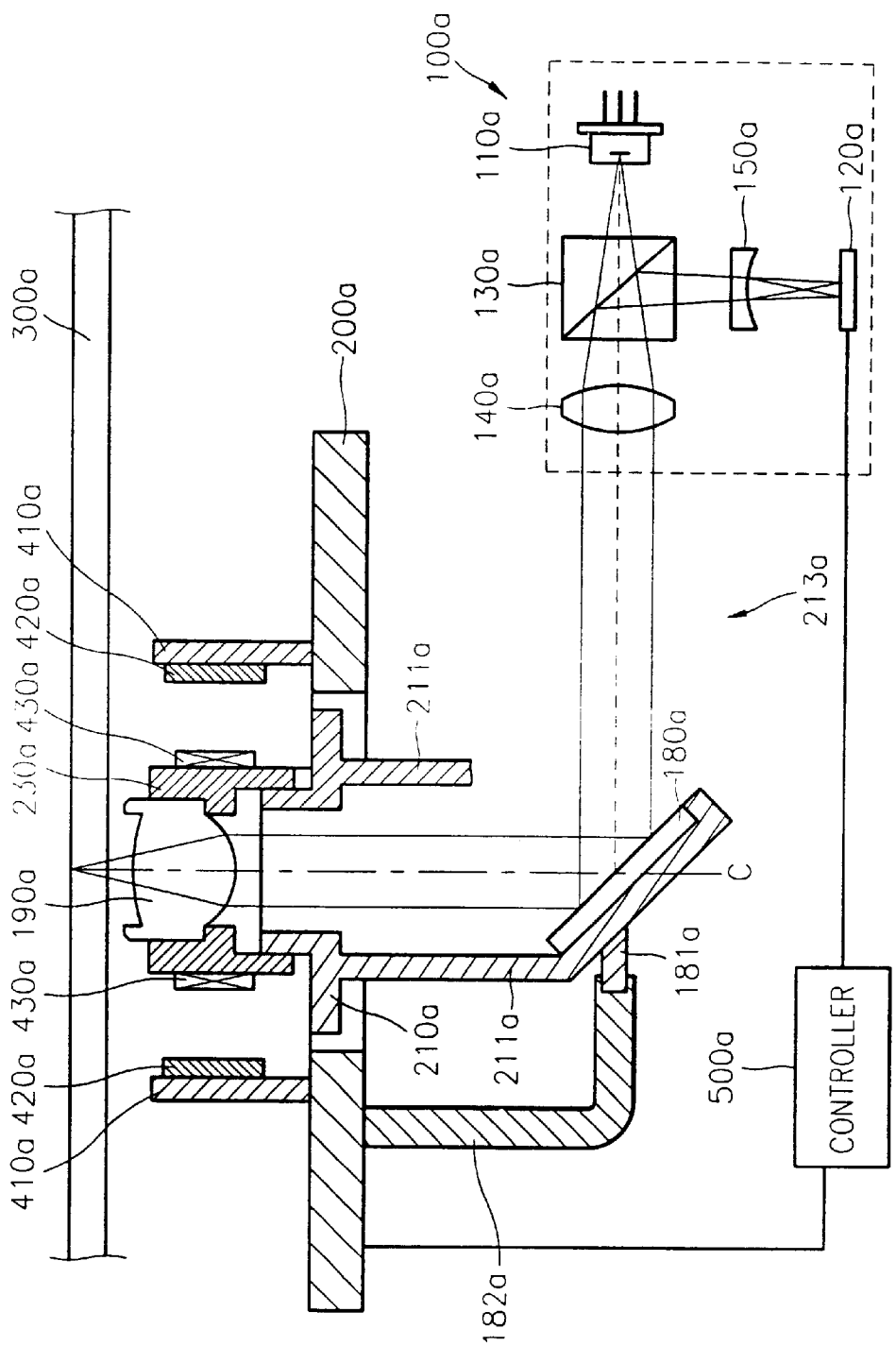
FIG. 12 is a sectional view of the optical pickup shown in FIG. 11.
Figure 13:
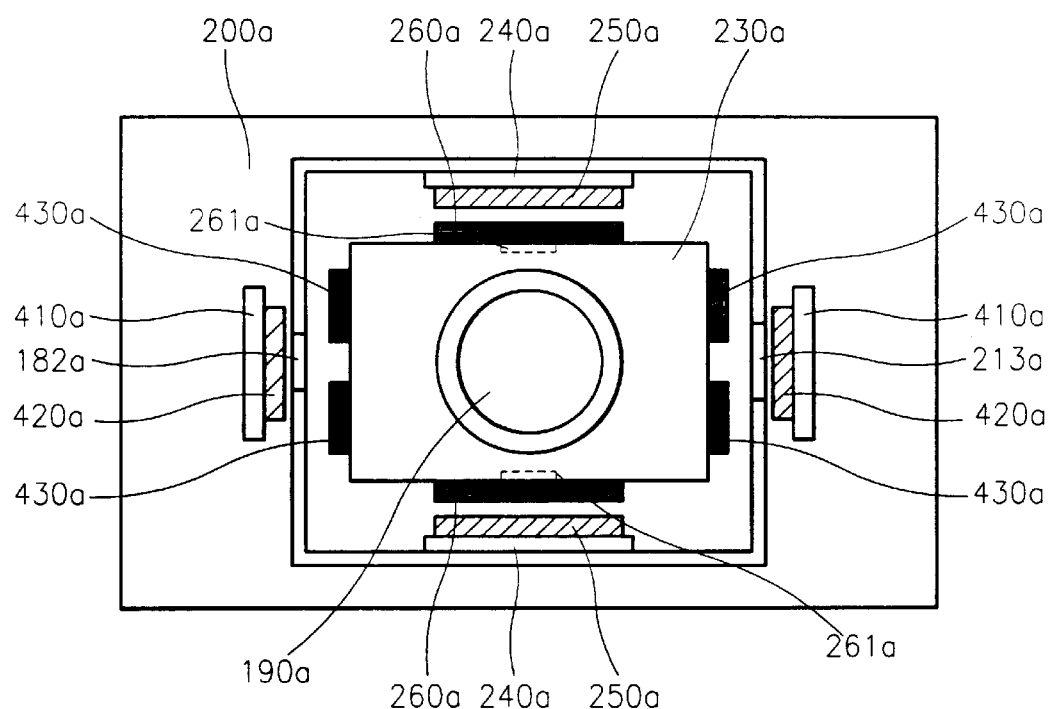
FIG. 13 is a plane view of the optical pickup shown in FIG. 11.
Figure 14:
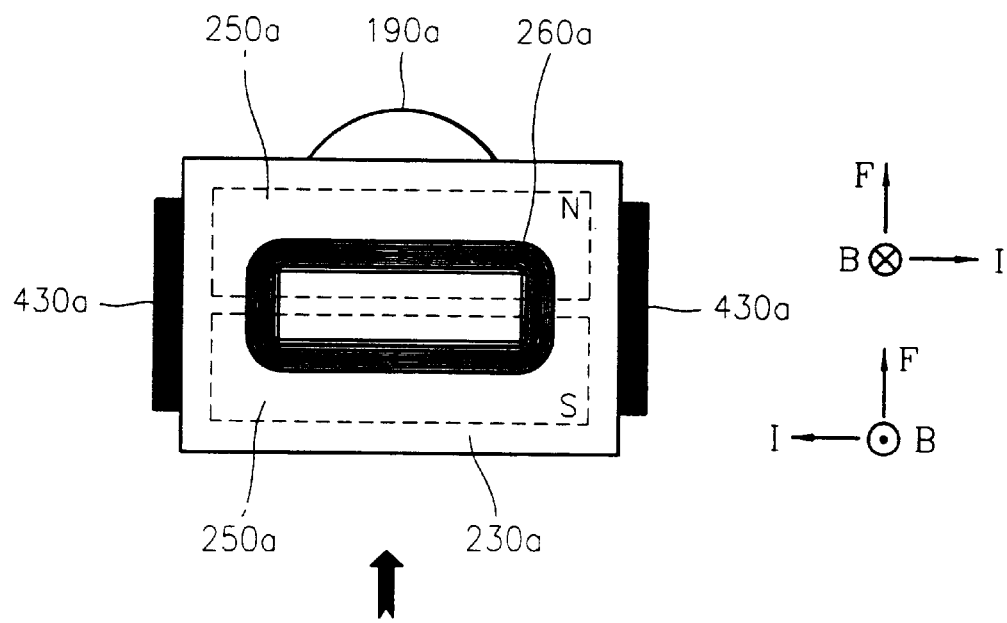
FIGS. 14 and 15 are diagrams illustrating the focusing operation of the optical pickup shown in FIG. 11.
Figure 15:
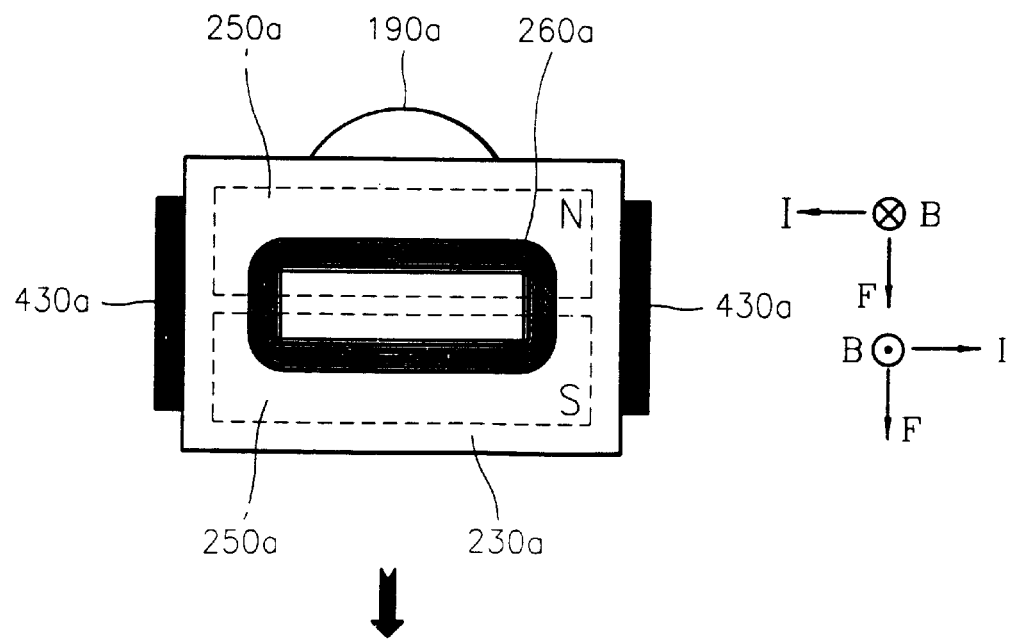

Referring to FIGS. 11 through 13, a predetermined base plate 210a is installed to be rotatable on a fixed base 200a. Such a rotatable supporting structure will be described later. Also, a bobbin 230a in which an objective lens 190a is mounted is coupled to a hollow boss 201a formed on the base plate 210a. A pair of focusing coils 26a are formed on opposite sides of the bobbin 230a, respectively. The bobbin 230a can rise by itself being coupled with the boss 201a, however its movement is restricted in the horizontal direction. Thus, the entire base plate 210a must be moved in order to move the bobbin 230a in the horizontal direction. Also, first magnets 250a and first yokes 240a for producing electromagnetic forces capable of driving the bobbin 230a by producing magnetic fields perpendicular to the direction of the current flowing through the focusing coils 260a are installed on the base plate 210a. Two of the first magnets 250a are in contact with one of the first yokes 240a and two other ones of the first magnets 250a are in contact with the other one of the first yokes 240a. Reference numeral 261a represents iron cores for concentrating magnetic flux. Also, the first magnets 250a and the focusing coils 260a are arranged to face each other, and are arranged to overlap each other as shown in FIGS. 14 and 15. Also, the first magnets 250a in contact with the same first yoke 204a have opposite polarity and are arranged in a vertical direction relative to each other, to produce magnetic fields in opposite directions. When current I flows through the corresponding focusing coil 260a as shown in FIG. 14, the electromagnetic force acts upward according to the Fleming's law, thereby raising the bobbin 230a by the electromagnetic force. On the contrary, when current I flows through the focusing coil 260a as shown in FIG. 15, the electromagnetic force acts downward, thereby lowering the bobbin 230a.

Also, as shown in FIG. 12, the optical pickup according to the second embodiment of the present invention comprises a fixed optical system 100a for irradiating light toward an optical disk 300a and receiving the light reflected by the optical disk 300a. The fixed optical system 100a comprises a light source 110a for generating the light, a beam splitter 130a, a collimating lens 140a, a detecting lens 150a and a photodetector 120a. Also, a reflecting mirror 180a for changing the traveling path of the incident light output from the fixed optical system 100a is installed between the objective lens 190a and the fixed optical system 100a. The reflecting mirror 180a is fixed to a pair of arms 211a extending from the base plate 210a to be integrally movable with the base plate 210a. Also, one of the arms 211a, which shields the base of the reflecting mirror 180a, has a predetermined coupling bar 181a, and the coupling bar 181 is rotatably coupled to a support arm 182a fixed to the fixed base 200a. Thus, the support arm 182a supports the entire base plate 210 in addition to the reflecting mirror 180a against the fixed base 200a, and simultaneously serves as a rotary shaft of the base plate 210a by rotatably supporting the reflecting mirror 180a.

Figure 16:
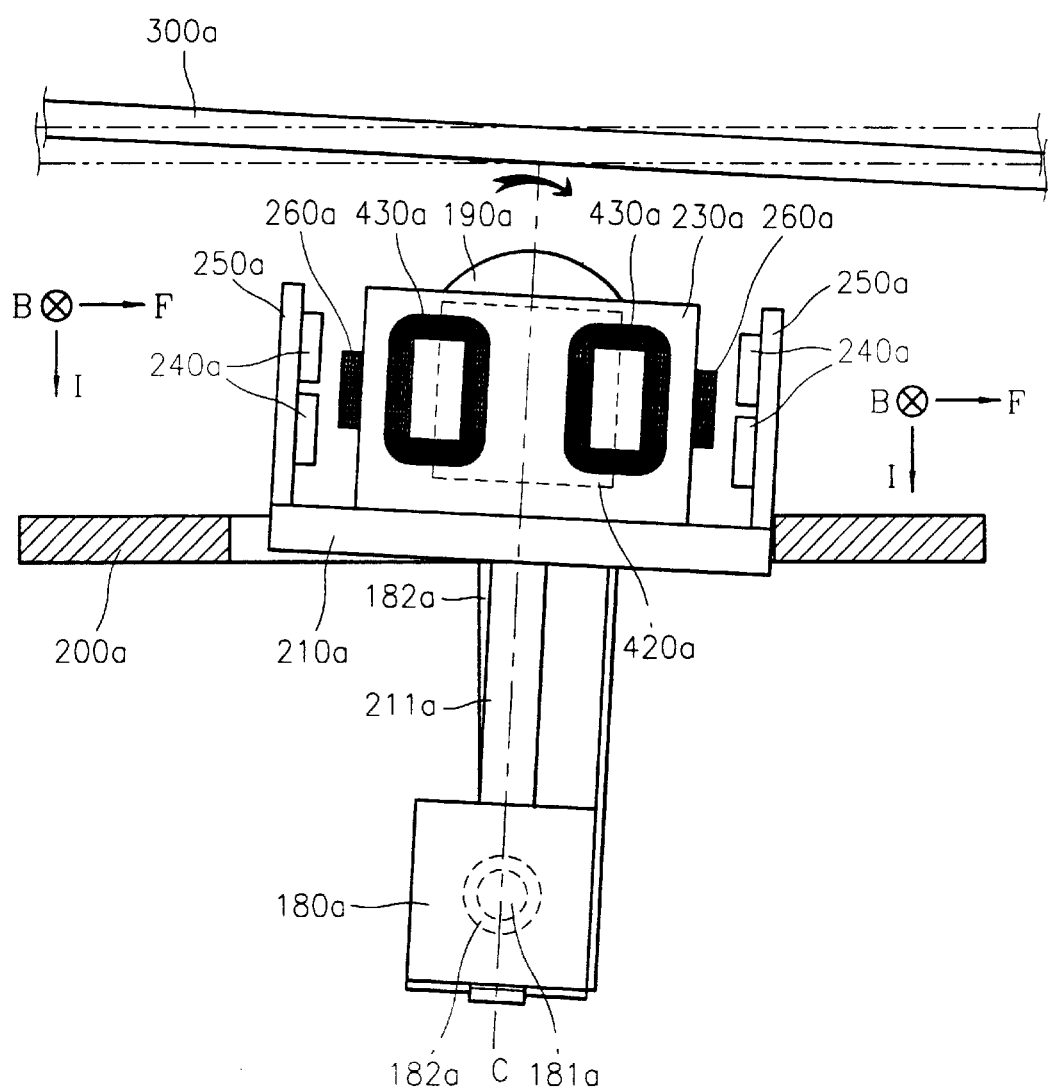
FIGS. 16 and 17 are diagrams illustrating the adjustment operation of the optical pickup shown in FIG. 11 to compensate for the tilt of an optical disk.
Figure 17:
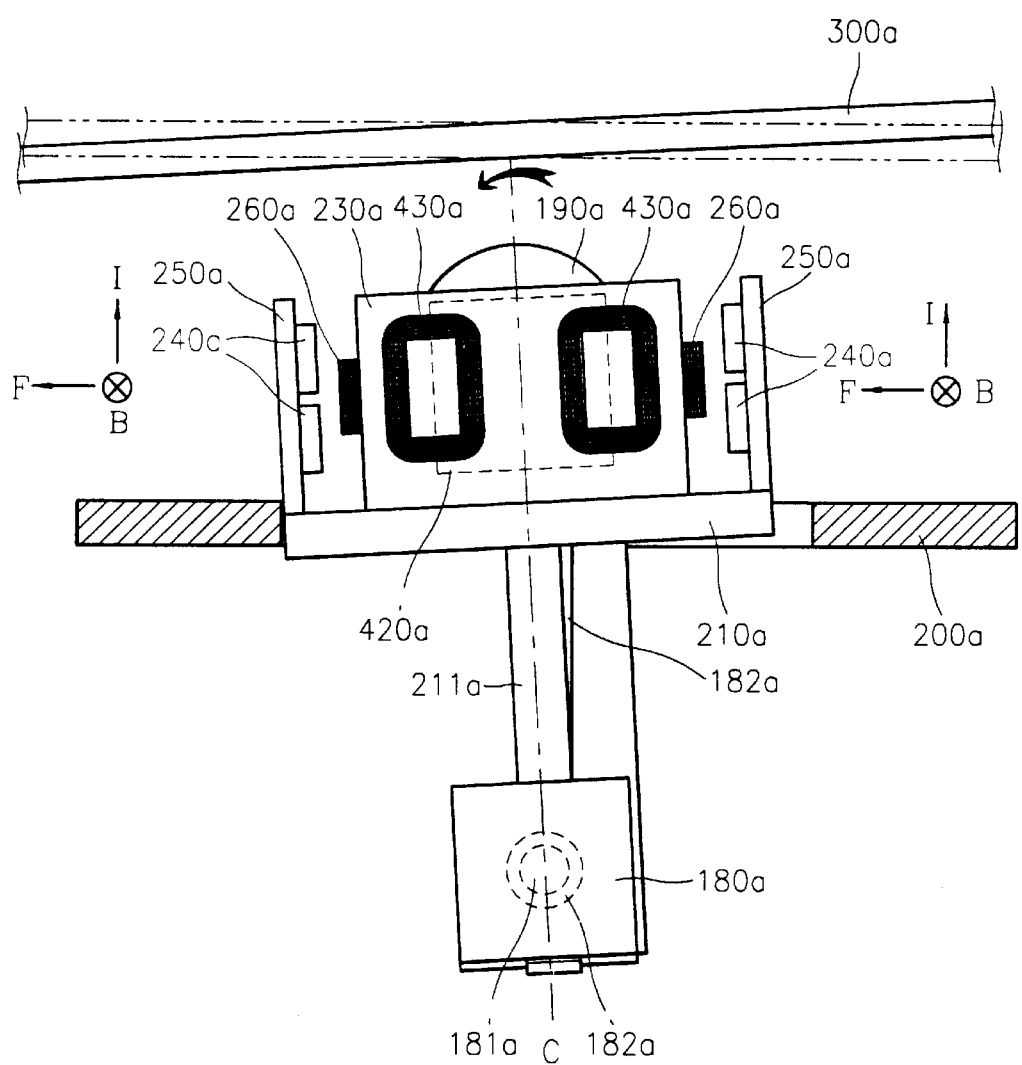

Also, there is tilt means for adjusting the tilt of an optical axis C passing through the objective lens 190a and the reflecting mirror 180a by rotating the base plate 210a. The tilt means comprises tilt coils 430a attached to the outer wall of the bobbin 230a, second magnets 420a and second yokes 410a installed on the fixed base 200a, for producing magnetic fields perpendicular to the current flowing through the tilt coils 430a to produce an electromagnetic force capable of rotating the base plate 210a. Here, the pairs of tilt coils 430a are symmetrically arranged centering around the bobbin 230a, respectively facing each second magnet 420a. Also, as shown in FIGS. 16 and 17, the tilt coils 430a are arranged such that only the inner vertical parts thereof overlap the second magnets 420a. Reference numeral 500a (shown in FIG. 12) represents a controller for controlling the current flowing through the tilt coils 430a and the focusing coils 260a.

In the optical pickup constructed as above, when the optical disk 300a is level, current does not flow through the tilt coils 430a and accordingly the base plate 210a maintains the level state without rotation. In this state, the focusing operation by the focusing coils 260a, the first magnets 250a and the first yokes 240a is also performed.

Also, when the optical disk 300a tilts to the right (clockwise) as shown in FIG. 16, the controller 500a allows current to flow through the tilt coils 430a in the direction indicated in FIG. 16. Here, the effect of the current horizontally flowing through the tilt coils 430a is offset, and an electromagnetic force is produced in the direction F due to the interaction between the current I that flows vertically and the magnetic fields B produced by the second magnets 420a, so that the base plate 210a rotates clockwise on the support arm 182a coupled to the coupling bar 181a. That is, the base plate 210a is rotated so as to be tilted as much as the optical disk 300a such that the optical axis C is perpendicular to the optical disk 300a.

On the other hand, when the optical disk 300a tilts to the left (counterclockwise) as shown in FIG. 17, the controller 500a allows current to flow through the tilt coils 430a in the direction indicated in FIG. 17. Accordingly, an electromagnetic force is produced in the direction F due to the interaction with the magnetic fields B produced by the second magnets 420a, so that the base plate 210a rotates counterclockwise. As a result, the rotation direction of the base plate 210a can be controlled by controlling the direction of current flowing through the tilt coils 430a. Thus, the tilting of the optical axis C passing through the objective lens 190a and the reflecting mirror 180a can be dynamically offset by rotating the base plate 210a.

Also, the optical pickup according to the second embodiment of the present invention can perform the tracking operation by the above-described tilt means. That is, while rotating the base plate 210a using the electromagnetic force produced by the tilt coils 430a and the second magnets 420a, the optical axis C is microscopically moved for the tracking operation. Thus, the optical axis C is microscopically adjusted in accordance to the tilt of the optical disk 300a through the tilt operation, and then the base plate 210a is microscopically rotated in a state such tat the tracking operation is performed along the tracks of the optical disk 300a. Thus, the tracking operation can be performed without extra coils and magnets for the tracking in this embodiment.

An optical pickup according to a third embodiment of the present invention will be described with reference to FIGS. 18 through 26, which comprises coils for tracking and tilting separately.

Figure 18:
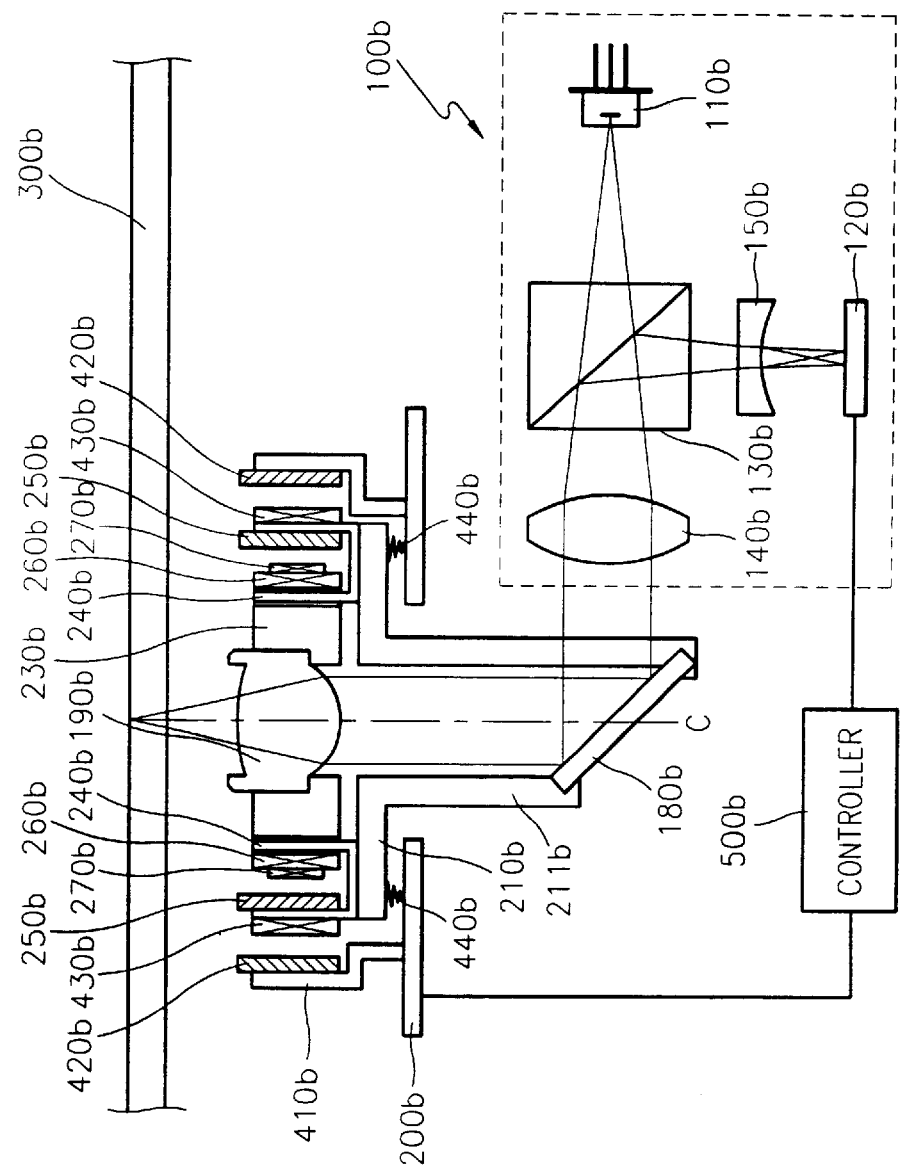
FIG. 18 is a sectional view showing the structure of an optical pickup according to a third embodiment of the present invention.
Figure 19:
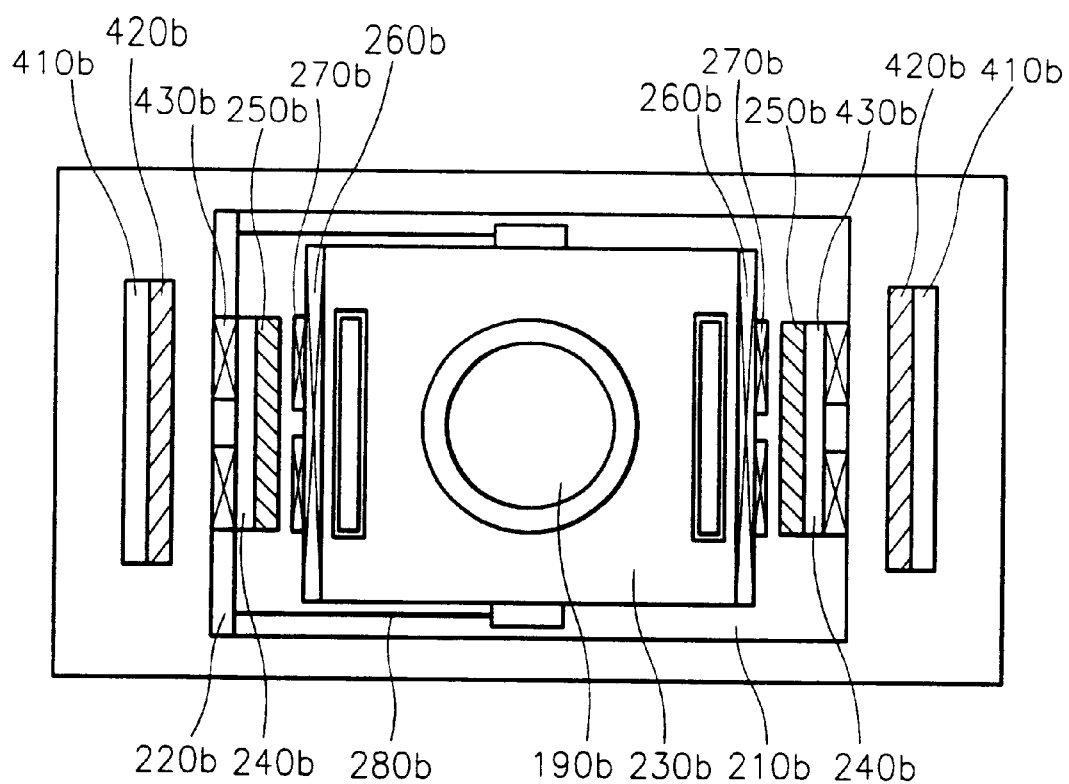
FIG. 19 is a plane view of the optical pickup shown in FIG. 18.
Figure 20:
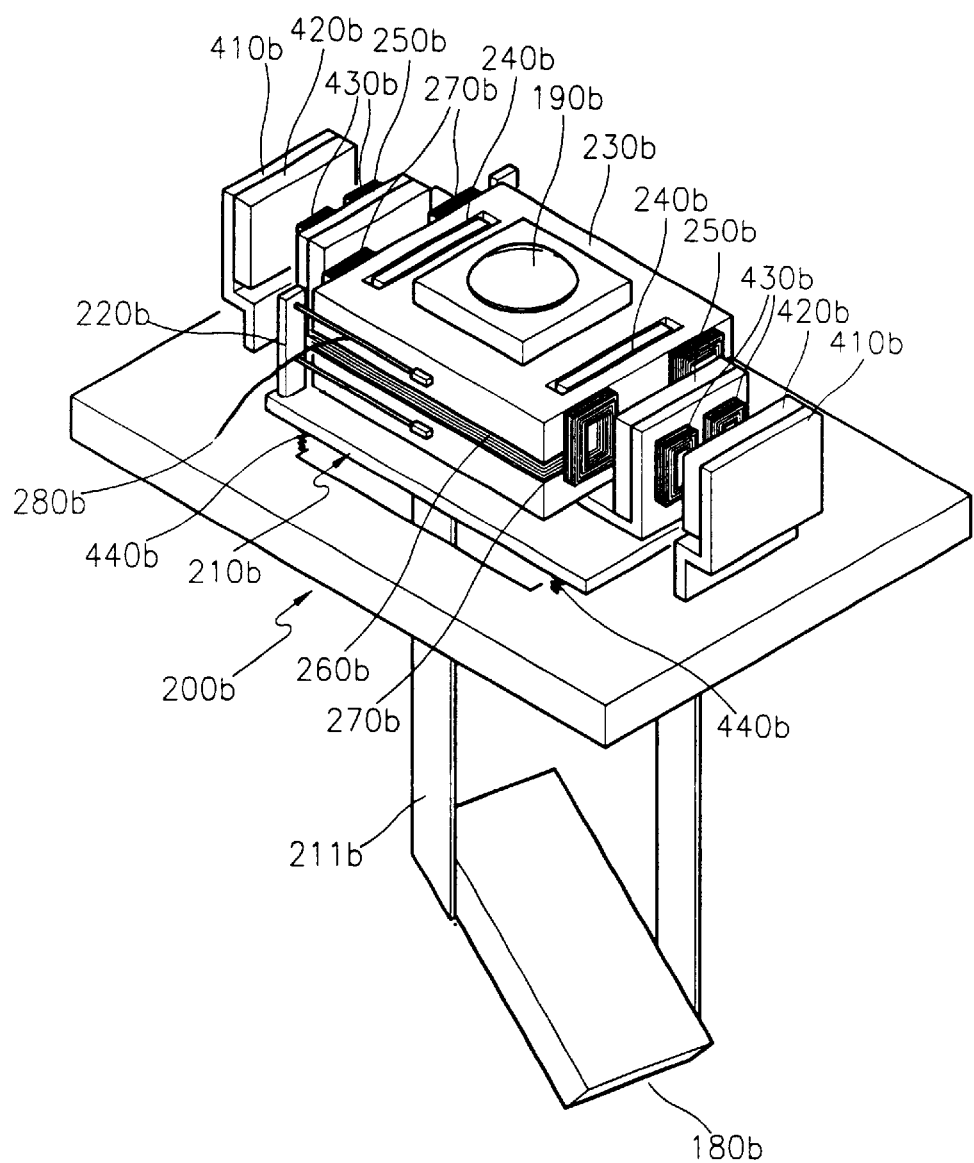
FIG. 20 is a perspective view showing the main elements of the optical pickup shown in FIG. 18.

Referring to FIGS. 18 through 20, a base plate 210b is installed on a fixed base 200b, the base plate 210b being supported by springs 440b to be tilted at different angles, and a bobbin 230b is movably supported by wires 280b connected to a fixed block 220b above the base plate 210. Also, an objective lens 190b for focusing an incident light to form a spot of light on a recording medium such as an optical disk 300b is mounted in the bobbin 230b, and a focusing coil 260b and tracking coils 270b serving as a current flow path for focusing and tracking operations are installed. There are two tracking coils 270b on each of two opposite sides of the bobbin 230b. Also, first magnets 250b and first yokes 240b for producing magnetic fields perpendicular to the current flowing through the focusing coil 260b and the tracking coils 270b to produce an electromagnetic force for driving the bobbin 230b are installed in the base plate 210b. Also, the optical pickup according to the third embodiment of the present invention comprises a fixed optical system 100b for irradiating light onto the optical disk 300b and receiving the light reflected by the optical disk 300. The fixed optical system 100b includes a light source 110b, a beam splitter 130b, a collimating lens 140b, a detecting lens 150b and a photodetector 120b. Also, a reflecting mirror 180b for changing the traveling path of an incident light is arranged between the objective lens 190b and the fixed optical system 100b. The reflecting mirror 180b is fixed to a pair of arms 211b extended from the base plate 210b to be integrally movable with the base plate 210b.

Also, there is tilt means for adjusting the tilt of an optical axis C passing through the objective lens 190b and the reflecting mirror 180b by rotating the base plate 210b. The tilt means comprises tilt coils 430b attached to each outer wall of the first yokes 240b to provide a current flow path, and second magnets 420b and second yokes 410b installed on the fixed base 200b to produce magnetic fields perpendicular to the current flowing through the tilt coils 430b, thereby producing an electromagnetic force capable of rotating the base plate 210. Here, the pairs of tilt coils 430b are symmetrically arranged centering around the bobbin 230b, respectively facing each second magnet 420b.

Figure 21:
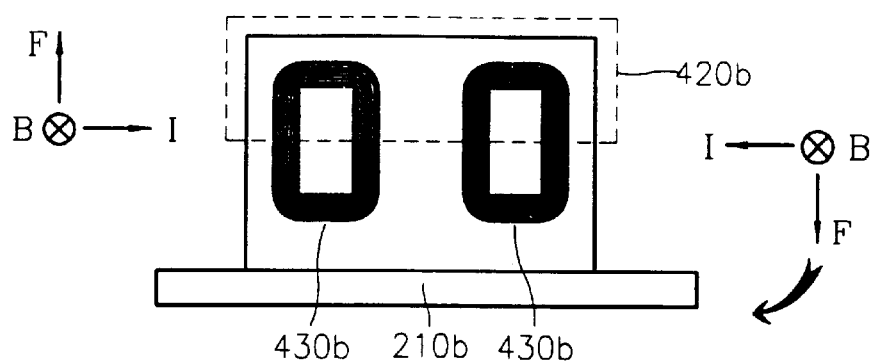
FIGS. 21 through 23 are diagrams illustrating the principle of a tilt operation of the optical pickup shown in FIG. 18.
Figure 22:
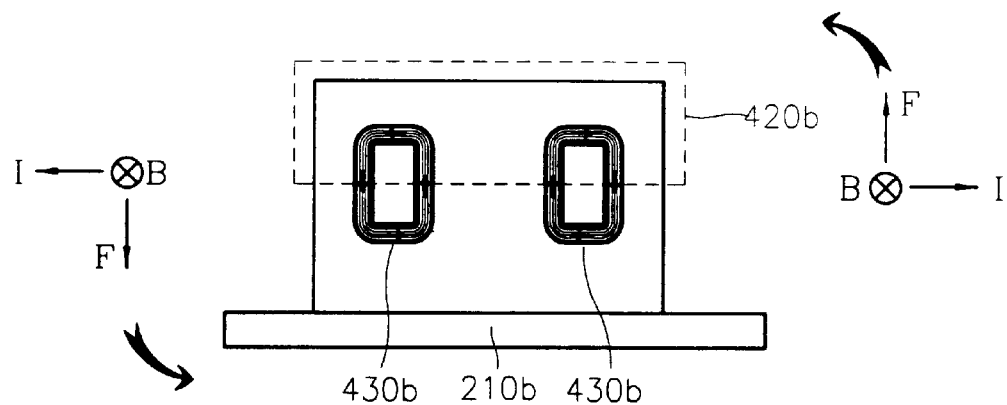
Figure 23:
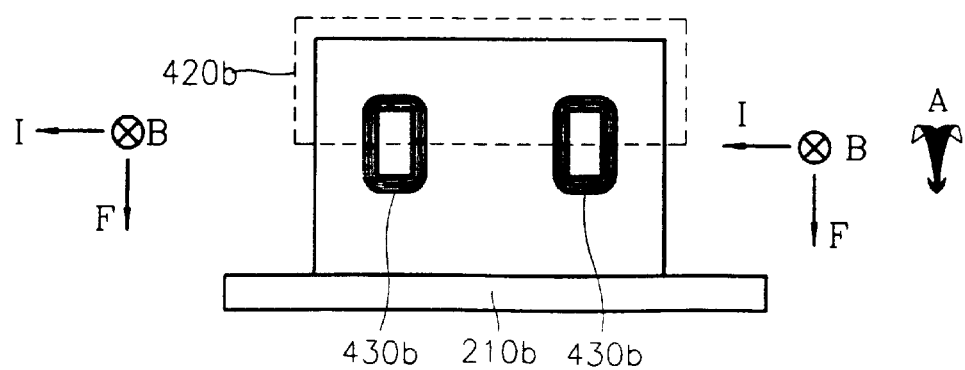

Also, as shown in FIGS. 21 through 23, the tilt coils 430b and the second magnets 420b are arranged such that only the upper parts of each pair of the tilt coils 430b overlap the corresponding second magnets 420b. In this overlapped state, current I flows through the pair of tilt coils 420b in the direction indicated by arrows as shown in FIG. 21, the effect of the current flowing vertically through the tilt coils 430b is offset, and an electromagnetic force is produced in the direction F due to the interaction between the current I that flows horizontally and the magnetic fields B produced by the second magnets 420b, so that the base plate 210b rotates clockwise. On the contrary, when current I flows through the tilt coils 430b in the direction indicated by arrows as shown in FIG. 22, an electromagnetic force is produced in the direction F due to the interaction with the magnetics field B by the second magnets 420b, so that the base plate 210b rotates counterclockwise. Also, as shown in FIG. 23, when current I flows through the pair of tilt coils 430b installed at one side of the bobbin 230b, a force acts on that side downward. In this state, when the current flows through the pair of tilt coils 430b installed at the other side of the bobbin 230b, a force acts on the other side upward. As a result, the base plate 210b rotates in the direction A indicated by the arrow. Thus, the rotation direction of the base plate 210b can be controlled by controlling the direction of current flowing through the tilt coils 430b. Reference numeral 500b (shown in FIG. 18) represents a controller for controlling the current flow through the tilt coils 430b and through the focusing coil 260b and the tracking coils 270b. Accordingly, the base plate 210b is rotatable about two different axes.

Figure 24:
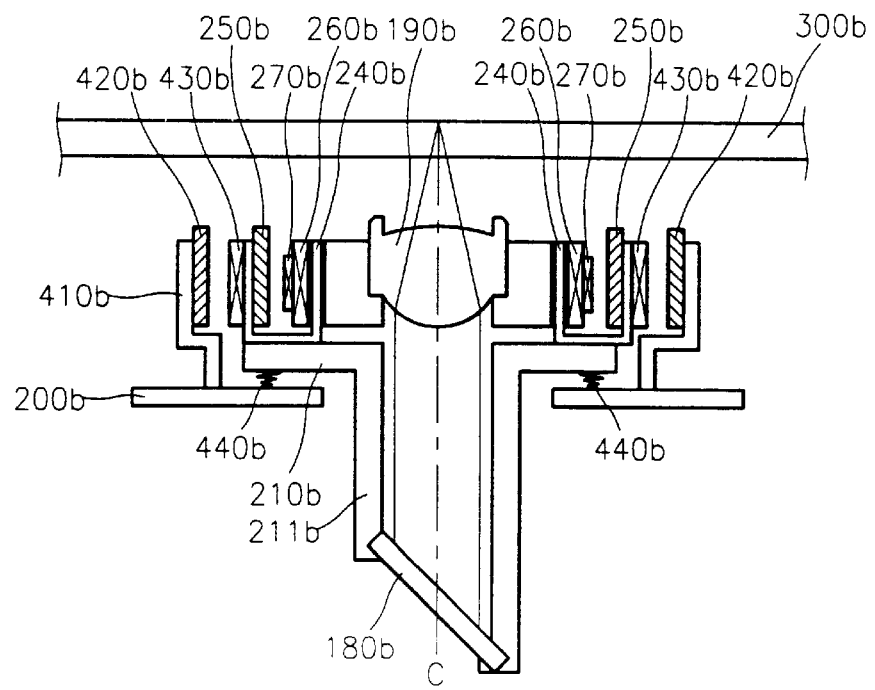
FIGS. 24 through 26 are diagrams illustrating the adjustment operation of the optical pickup shown in FIG. 18 to compensate for the tilt of an optical disk.

In the optical pickup constructed as above, when the optical disk 300b for a data recording/reproduction is level as shown in FIG. 24, current does not flow through the tilt coils 430b and accordingly the base plate 210b maintains the level state without rotation. In this state, the focusing operation by the focusing coils 260b, the tracking coils 270b, the first magnets 250b and the first yokes 240b is also performed.

Figure 25:
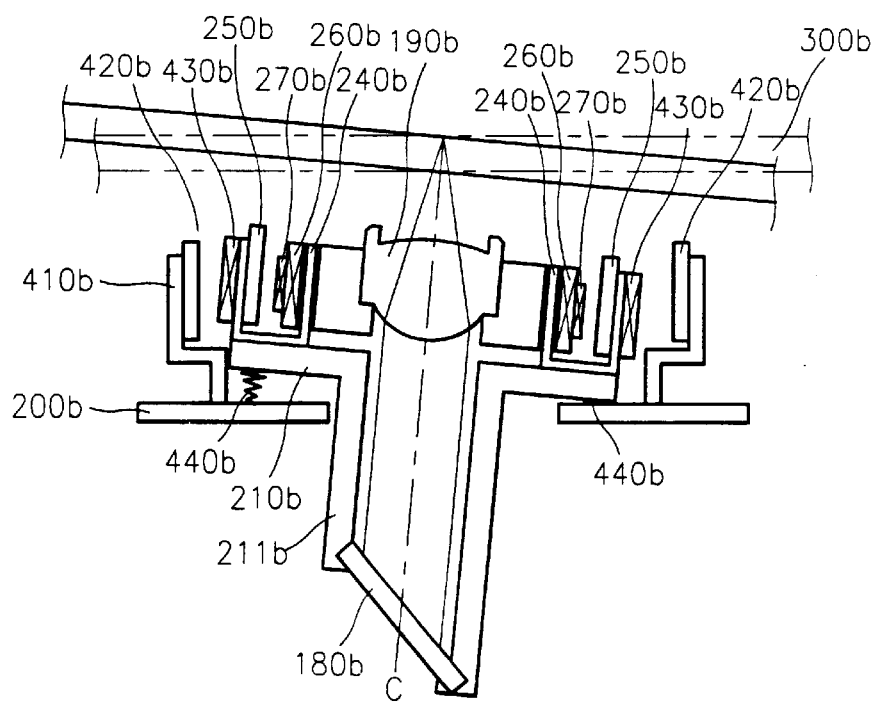

Also, when the optical disk 300b tilts to the right (clockwise) as shown in FIG. 25, the controller 500b allows current to flow through the tilt coils 430b in the direction indicated in FIG. 21 to rotate the base plate 210b clockwise such that the optical axis C passing through the objective lens 190b and the reflecting mirror 180b is incident perpendicularly to the optical disk 300b. That is, the base plate 210b is rotated being tilted as much as the optical disk 300b such that the optical axis C is perpendicular to the optical disk 300b.

Figure 26:
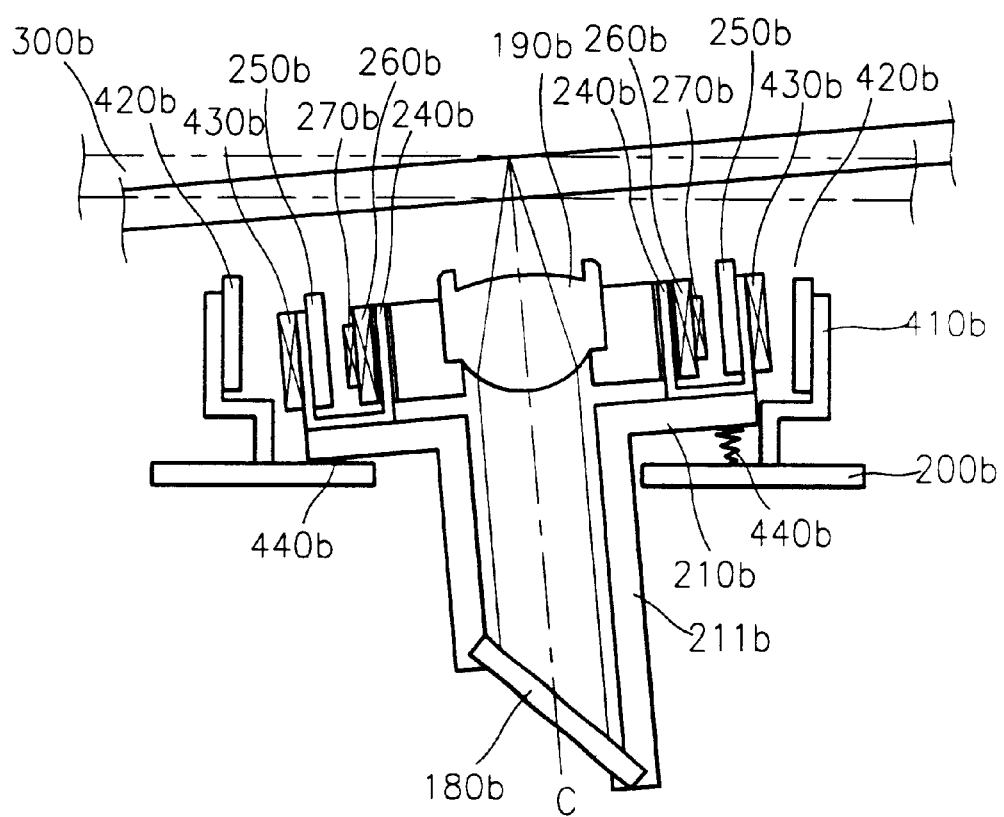

Meanwhile, when the optical disk 300b tilts to the left (counterclockwise) as shown in FIG. 26, the controller 500b allows current to flow through the tilt coils 430b in the direction indicated in FIG. 22, to rotate the base plate 210b counterclockwise.

The tilting of the optical axis C passing through the objective lens 190b and the reflecting mirror 180b can be dynamically offset by rotating the base plate 210b according to the tilt of the optical disk 300b.

Also, the second magnets 420b are arranged to overlap with only the upper parts of the corresponding tilt coils 430b. However, the electromagnetic force as above can be produced when the second magnets 420b overlap the lower parts of the corresponding tilt coils 430b.

An optical pickup according to a fourth embodiment of the present invention will be described with reference to FIGS. 27 through 29, which also comprises extra coils for separately tracking and tilting.

Figure 27:
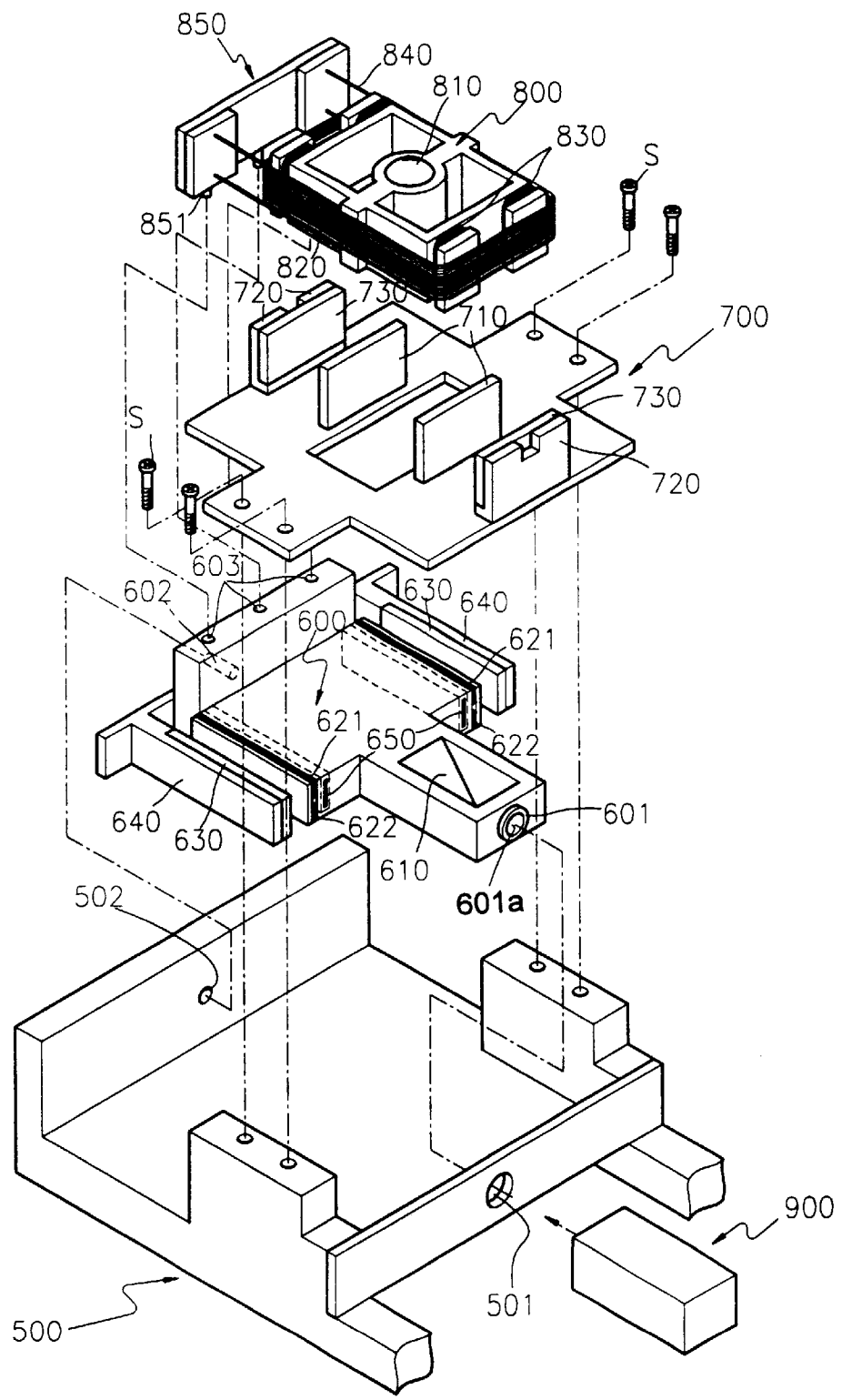
FIG. 27 is an exploded perspective view of an optical pickup according to a fourth embodiment of the present invention.
Figure 28:
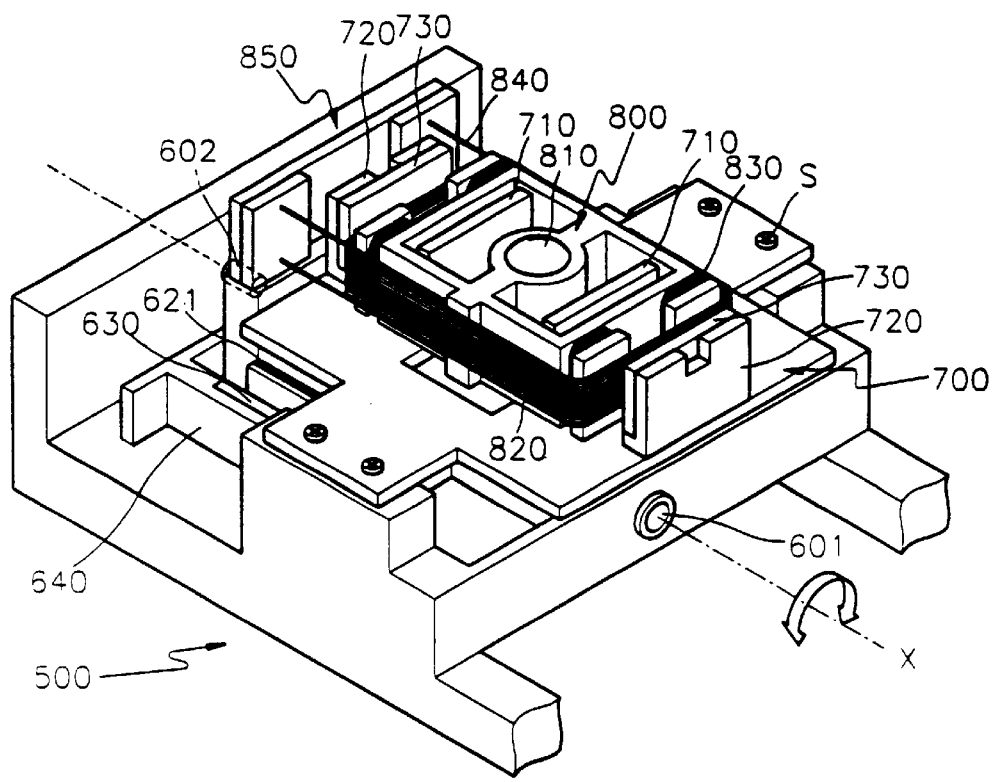
FIG. 28 is a perspective view of the assembled optical pickup shown in FIG. 18.
Figure 29:
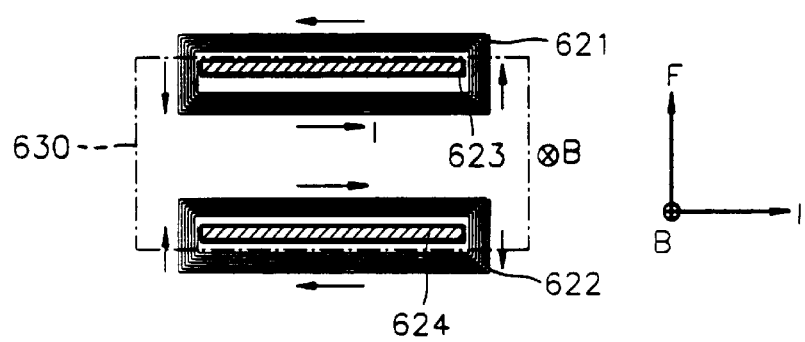
FIG. 29 is a diagram illustrating the adjustment operation of the optical pickup shown in FIG. 27 to compensate for the tilt of an optical disk.

Referring to FIGS. 27 and 28, a base plate 700 is coupled by screws S to a fixed base 500 in which a fixed optical system 900 is installed. The fixed optical system 900 comprises the same elements as in the first, second and third embodiments. Also, first magnets 730 and first inner and outer yokes 710 and 720, for producing an electromagnetic force capable of driving a bobbin 800 through interaction with a focusing coil 820 and tracking coils 830, are installed on the base plate 700. Two tracking coils 830 are formed on each of two opposite sides of the bobbin 800. The first magnets 730 and the first inner and outer yokes 710 and 720 are fixed at all times because the base plate 700 is coupled to the fixed base 500 by the screws S. Meanwhile, a rotary block 600 in which a reflecting mirror 610 is mounted is rotatably installed on the fixed base 500. That is, rotary protrusions 601 and 602 formed at the front and back of the rotary block 600 are respectively inserted into coupling holes 501 and 502 formed on the fixed base 500 such that the rotary block 600 is rotatably supported by the fixed base 500. In particular, the rotary protrusions 601 formed at the front of the rotary block 601 has a hollow 601a through which the light emitted from the fixed optical system 900 reaches the reflecting mirror 610. Also, a pair of tilt coils 621 and 622 is installed as tilt means on both sides of the rotary block 600. Second inner yokes 650 are installed on the rotary block 600. Second outer yokes 640 on which second magnets 630 are respectively attached and the corresponding second inner yokes 640 stand opposite each other with some distance therebetween so that an electromagnetic force can occur with current flowing through the tilt coils 621, 622. The tilt means produces an electromagnetic force for rotating the rotary block 600 centering around a rotary axis C shown in FIG. 28. As shown in FIG. 29, the tilt coils 621 and 622 are arranged such that the center parts of the tilt coils 621 and 622 overlap the corresponding second magnets 630. Reference numerals 623 and 624 represent iron cores around which the tilt coils 621 and 622 are wound for attraction with the second magnets 630, which contributes to up-and-down balance of the magnetic field lines with the second magnets 600, such that the rotary block 600 is level. Thus, the irons cores 623 and 624 are arranged to be symmetrical in the vertical direction to the magnetic force of the second magnets 630.

A holder 850 having wires 840 supporting the bobbin 800 is mounted on the rotary block 600. That is, coupling protrusions 851 formed on the bottom of the holder 850 are inserted into coupling holes 603 formed in the top of the rotary block 600, such that the holder 850 is fixed to the rotary block 600. Thus, as the rotary block 600 rotates, the holder 850 and the bobbin 800 supported by the holder 800 rotate together. An objective lens 810, the focusing foil 820 and the tracking coils 830 are installed on the bobbin 800. As the holder 850 is coupled to the rotary block 600, the focusing coil 820 and the tracking coils 830 are placed between the first magnets 730 attached to the first outer yokes 720, and the first inner yokes 710. Thus, the bobbin 800 moves while being supported by the wires 840 due to the current flowing through the focusing coil 820 and the tracking coils 830, and magnetic field lines due to the first magnets 730 and the first inner and outer yokes 710 and 720. Accordingly, the objective lens 810 can perform the focusing and tracking operations.

In the optical pickup having the above-described structure, the tilt means rotates the rotary block 600 such that the optical axis passing through the objective lens 810 is incident perpendicular to an optical disk (not shown). That is, when the current I flows through the tilt coils 621 and 622 placed at one side of the rotary block 600, an electromagnetic force F is produced upward due to the interaction with the magnetic field lines B by the second magnets 630. Also, when the current I flows in the opposite direction through the tilt coils 621 and 622 placed at the other side, an electromagnetic force is produced downward. As a result, the rotary block 600 rotates centering around the rotary axis X. When the current flows through the tilt coils 621 and 622 in the opposite direction to the above, the rotary block 600 rotates in the opposite direction.

In the optical pickup according to the fourth embodiment of the present invention, the rotary block 600 that is integrally movable with the holder 850 of the bobbin 800 is rotated according to the tilt of an optical disk, so that the tilt of the optical axis passing through the objective lens 810 and the reflecting mirror 610 can be dynamically compensated for.

In addition, in the optical pickup having the above structure according to the fourth embodiment, the first magnets 730 and the first inner and outer yokes 710 and 720 for the tracking and focusing operations are fixed to the base plate 700 connected with the fixed base 500, the weights of the first magnets 730 and the first inner and outer yokes 710 and 720 do not affect the rotary operation for the tilt adjustment at all. That is, since only the rotary block 600, and the bobbin and holder 850 which are integrally connected to the rotary block 600, rotate for the tilt operation, the weight of objects to rotate for the tilt operation become light compared to that in the first, second and third embodiments. Thus, mass inertial moment for the tilt operation decreases, so that the driving sensitivity is enhanced, and the tilt adjustment can be performed with a low driving current.

As described above, in the optical pickups according to the embodiments of the present invention, the tilt of the optical axis of the light incident onto and reflected by an optical disk through a reflecting mirror and an objective lens can be adjusted according to the tilt of the recording medium, such that the light is perpendicularly incident onto and reflected by the recording medium at all times.

What is claimed is:

1. An optical pickup comprising:
    a light source to generate a light beam; and
    an optical directing unit to direct and focus the light beam on an information surface of a recording medium, and to adjust an optical axis of the light beam to be substantially perpendicular to the information surface in response to changes in orientation of the information surface while the light beam is directed and focused on the information surface,
    the optical directing unit comprising a support arm to support a reflecting mirror, the reflecting mirror reflecting the light beam towards the information surface.

2. An optical pickup to irradiate an incident light beam on a recording medium having an information surface, comprising:
    a fixed optical system to generate the incident light beam; and
    an optical directing unit to direct and focus the incident light beam on the information surface, and adjust an optical axis of the incident light beam to be substantially perpendicular to the information surface in response to changes in orientation of the information surface while the incident light beam is directed and focused on the information recording surface,
    wherein the optical directing unit comprises:
        a fixed base;
        a base plate; and
        a connecting element connecting the base plate and the fixed base, to enable rotation of the base plate relative to the fixed base,
        wherein the connecting element comprises:
            a support arm to support a reflecting mirror, the support arm having one end fixed to the fixed base and the other end rotatably supporting the reflecting mirror.

3. The optical pickup of claim 2, wherein the optical directing unit further comprises:
    a bobbin holding an objective lens and mounted on the base plate, said reflecting mirror reflecting light towards the objective lens; and
    a tilt unit to generate a force which rotates the base plate relative to the fixed base through the connecting element, to tilt the bobbin and objective lens.

4. The optical pickup of claim 3, wherein the connecting elements is a plurality of elastic members connecting the base plate and the fixed plate.

5. The optical pickup of claim 2, wherein the optical directing unit comprises:
    a rotary block having rotary protrusions which engage the fixed base, so as to be rotatable relative to the fixed base;
    a bobbin holding an objective lens and mounted on the rotary block; and
    a tilt unit to generate a force which rotates the rotary block relative to the fixed base, to tilt the bobbin and objective lens.

6. The optical pickup of claim 5, wherein the tilt unit comprises:
    first and second pairs of tilt coils formed on the rotary block; and
    magnets and yokes to produce the force with corresponding ones of the first and second pairs of tilt coils.

7. The optical pickup of claim 3, wherein the tilt unit rotates the base plate about two different axes perpendicular to each other.

8. The optical pickup of claim 3, further comprising:
    a boss, extending from the base plate, and on which the bobbin is slidably movable in only a direction of the optical axis of the incident light beam.

9. An optical pickup to irradiate an incident light beam on a recording medium having an information surface, comprising:
    a fixed optical system to generate the incident light beam; and
    an optical directing unit to direct and focus the incident light beam on the information surface, and adjust an optical axis of the incident light beam to be substantially perpendicular to the information surface in response to changes in orientation of the information surface while the incident light beam is directed and focused on the information recording surface,
    wherein the optical directing unit comprises:
        a fixed base;
        a base plate;
        a bobbin holding an objective lens and mounted on the base plate;
        a connecting element connecting the base plate and the fixed base, to enable rotation of the base plate relative to the fixed base; and a tilt unit to generate a force which rotates the base plate relative to the fixed base through the connecting element, to tilt the bobbin and objective lens, and wherein the connecting element comprises:
a reflecting mirror to change a traveling path of the incident light beam toward the objective lens and fixed to the base plate, and
a support arm having one end fixed to the fixed base and the other end rotatably supporting the reflecting mirror; and the tilt unit comprises:
first and second pairs of tilt coils formed on the base plate, and
magnets and yokes to produce the force with corresponding ones of the first and second pairs of tilt coils.

10. An optical pickup to irradiate an incident light beam on a recording medium having an information surface, comprising:

a fixed optical system to generate the incident light beam; and an optical directing unit to direct and focus the incident light beam on the information surface, and adjust an optical axis of the incident light beam to be substantially perpendicular to the information surface in response to changes in orientation of the information surface while the incident light beam is directed and focused on the information recording surface, wherein the optical directing unit comprises:
a fixed base;
a base plate;
a bobbin holding an objective lens and mounted on the base plate;
a connecting element connecting the base plate and the fixed base, to enable rotation of the base plate relative to the fixed base; and
a tilt unit to generate a force which rotates the base plate relative to the fixed base through the connecting element, to tilt the bobbin and objective lens, and the connecting element comprises
a reflecting mirror to change a traveling path of the incident light beam toward the objective lens and fixed to the base plate, and
a support arm having one end fixed to the fixed base and the other end rotatably supporting the reflecting mirror; and the tilt unit comprises:
first and second pairs of tilt coils formed on the bobbin, and
magnets and yokes to produce the force with corresponding ones of the first and second pairs of tilt coils.

11. An optical pickup to irradiate an incident light beam on a recording medium having an information surface, comprising:

a fixed optical system to generate the incident light beam; and an optical directing unit to direct and focus the incident light beam on the information surface, and adjust an optical axis of the incident light beam to be substantially perpendicular to the information surface in response to changes in orientation of the information surface while the incident light beam is directed and focused on the information recording surface, first and second pairs of tracking coils formed on opposite sides of the bobbin; and first magnets and first inner and outer yokes formed at the opposite sides of the bobbin, to produce magnetic fields perpendicular to current flowing through the first and second pairs of tracking coils to produce an electromagnetic force to drive the bobbin to perform a tracking operation, the first magnets and first inner and outer yokes being installed on the base plate facing the first and second pairs of tracking coils, wherein the optical directing unit comprises:
a fixed base;
a base plate;
a bobbin holding an objective lens and mounted on the base plate;
a connecting element connecting the base plate and the fixed base, to enable rotation of the base plate relative to the fixed base; and
a tilt unit to generate a force which rotates the base plate relative to the fixed base through the connecting element, to tilt the bobbin and objective lens, and the connecting element comprises
a reflecting mirror to change a traveling path of the incident light beam toward the objective lens and fixed to the base plate,
a support arm having one end fixed to the fixed base and the other end rotatably supporting the reflecting mirror; and the tilt unit comprises
first and second pairs of tilt coils formed on first outer yokes, and
second magnets and second inner and outer yokes to produce the force with corresponding ones of the first and second pairs of tilt coils.

12. The optical pickup of claim 11, wherein the tilt unit rotates the base plate about two different axes perpendicular to each other.

13. An optical pickup to direct an incident light onto a recording medium and receive the light reflected from the recording medium, comprising:

a fixed base;
a base plate rotatably installed relative to the fixed base;
a bobbin seated on the base plate, being movably supported by wires;
an objective lens to focus the incident light to form a spot of light on the recording medium, the objective lens being mounted in the bobbin;
a focusing coil serving as a current flow path for a focusing operation, the focusing coil being installed on the bobbin;
first magnets and first yokes for producing magnetic fields perpendicular to current flowing through the focusing coil to produce an electromagnetic force to drive the bobbin, the first magnets and first yokes being installed on the base plate;
a fixed optical system to generate and irradiate the incident light toward the recording medium and receive the light reflected from the recording medium and then passed through the objective lens;
a reflecting mirror to change a traveling path of the incident light, the reflecting mirror being arranged between the objective lens and the fixed optical system, and fixed to the base plate;
a support arm having one end fixed to the fixed base and the other end rotatably supporting the reflecting mirror, serving as a rotary shaft of the base plate to which the reflecting mirror is fixed; and tilt means for rotating the base plate using the support arm as a rotary shaft, to adjust the tilt of an optical axis passing through the objective lens and the reflecting mirror.

14. The optical pickup of claim 13, wherein the tilt means comprises:
   tilt coils serving as second current flow paths, and attached to the first yokes; and
   second magnets and second yokes to produce a magnetic field perpendicular to current flowing through the tilt coils to produce an electromagnetic force to rotate the base plate, the second magnets and second yokes being installed on the fixed base.

15. The optical pickup of claim 14, wherein the tilt coils, second magnets and second yokes produce the electromagnetic force to perform a tracking operation of the incident light beam on tracks of the recording medium.

16. The optical pickup of claim 14, wherein only inner vertical parts of the tilt coils overlap corresponding ones of the second magnets.

17. An optical pickup to direct an incident light onto a recording medium and receive the light reflected from the recording medium, comprising:
   a fixed base;
   a base plate rotatably installed relative to the fixed base;
   a hollow boss formed to protrude from the base plate;
   a bobbin coupled to the boss to be movable in a vertical direction;
   an objective lens to focus the incident light to form a spot of light on the recording medium, the objective lens being mounted in the bobbin;
   focusing coils serving as a current flow paths for a focusing operation, the focusing coils installed on the bobbin;
   first magnets and first yokes for producing magnetic fields perpendicular to current flowing through the focusing coils to produce an electromagnetic force for driving the bobbin, the first magnets and first yokes being installed on the base plate;
   a fixed optical system to generate and irradiate the incident light toward the recording medium and receive the light reflected by the recording medium and then passed through the objective lens;
   a reflecting mirror to change a traveling path of the incident light, the reflecting mirror being arranged between the objective lens and the fixed optical system, and fixed to the base plate;
   a support arm having one end fixed to the fixed base and the other end rotatably supporting the reflecting mirror, serving as a rotary shaft of the base plate to which the reflecting mirror is fixed; and
   tilt means for rotating the base plate using the support arm as a rotary shaft, to adjust the tilt of an optical axis passing through the objective lens and the reflecting mirror.

18. The optical pickup of claim 17, wherein the tilt means comprises:
   tilt coils serving as second current flow paths, and attached to the bobbin; and
   second magnets and second yokes to produce magnetic fields perpendicular to current flowing through the tilt coils to produce an electromagnetic force to rotate the base plate coupled to the bobbin, the second magnets and second yokes being installed on the fixed base.

19. The optical pickup of claim 18, wherein the tilt coils, second magnets and second yokes produce the electromagnetic force to perform a tracking operation of the incident light beam on tracks of the recording medium.

20. The optical pickup of claim 18, wherein only inner vertical parts of the tilt coils overlap corresponding ones of the second magnets.

21. The optical pickup of claim 18, further comprising iron cores positioned between the focusing coils and the objective lens, respectively.

22. An optical pickup to direct an incident light onto a recording medium and receive the light reflected from the recording medium, comprising:
   a fixed base;
   a base plate positioned within the fixed base, and supported by springs to be rotatable relative to the fixed base;
   a bobbin seated on the base plate, being movably supported by wires;
   an objective lens to focus the incident light to form a spot of light on the recording medium, the objective lens being mounted in the bobbin;
   a focusing coil and tracking coils serving as a current flow path for focusing and tracking operations, the focusing coil and tracking coils being installed on the bobbin;
   first magnets and first yokes to produce magnetic fields perpendicular to current flowing through the focusing coil and the tracking coils to produce an electromagnetic force to drive the bobbin, the first magnets and first yokes being installed on the base plate;
   a fixed optical system to generate and irradiate the incident light toward the recording medium and receive the light reflected from the recording medium and then passed through the objective lens;
   a reflecting mirror to change a traveling path of the incident light, the reflecting mirror being arranged between the objective lens and the fixed optical system, and fixed to the base plate; and
   tilt means for elastically rotating the base plate elastically supported by the springs, to adjust the tilt of an optical axis passing through the objective lens and the reflecting mirror.

23. The optical pickup of claim 22, wherein the tilt means comprises:
   tilt coils serving as second current flow paths, and attached to the first yokes; and
   second magnets and second yokes to produce a magnetic field perpendicular to the current flowing through the tilt coils to produce an electromagnetic force to rotate the base plate, the second magnets and second yokes being installed on the fixed base.

24. The optical pickup of claim 23, wherein only upper parts of the tilt coils overlap corresponding ones of the second magnets.

25. An optical pickup to direct an incident light onto a recording medium and receive the light reflected from the recording medium, comprising:
   a fixed base;
   a rotary block rotatably installed on the fixed base;
   a holder integrally coupled to the rotary block and having wires extending therefrom;
   a bobbin movably supported by the wires of the holder;
   a base plate fixed to the fixed base and positioned between the rotary block and the bobbin;

an objective lens to focus the incident light to form a spot of light on the recording medium, the objective lens being mounted in the bobbin;

a focusing coil and tracking coils serving as a current flow path for focusing and tracking operations, the focusing coil and tracking coils being installed on the bobbin;

first magnets and first inner and outer yokes for producing magnetic fields perpendicular to current flowing through the focusing coil and the tracking coils to produce an electromagnetic force to drive the bobbin, the first magnets and first inner and outer yokes being installed on the base plate, facing the focusing coil and the tracking coils;

a fixed optical system to generate and irradiate the incident light toward the recording medium and receive the light reflected from the recording medium and then passed through the objective lens;

a reflecting mirror to change a traveling path of the incident light, the reflecting mirror being installed on the rotary block to be arranged between the objective lens and the fixed optical system; and tilt means for rotating the rotary block to adjust a tilt of an optical axis passing through the objective lens and the reflecting mirror.

26. The optical pickup of claim 25, wherein the tilt means comprises:

tilt coils serving as second current flow paths, the tilt coils being installed on opposite sides of the rotary block; and second magnets and second inner and outer yokes to produce magnetic fields perpendicular to the opposite current flowing through the tilt coils to produce an electromagnetic force for rotating the rotary block, the second magnets and second inner and outer yokes installed facing the tilt coils.

27. The optical pickup of claim 26, wherein a plurality of iron cores are installed at both sides of the rotary block to be symmetrical in a vertical direction such that the rotary block maintains a level state due to the magnetic force between the second magnets and the second inner and outer yokes.

* * * * *